(12) United States Patent
Zhai et al.

(10) Patent No.: US 8,619,190 B2
(45) Date of Patent: Dec. 31, 2013

(54) FILM MODE DETECTION

(75) Inventors: Fan Zhai, Richardson, TX (US); Weider Peter Chang, Hurst, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1520 days.

(21) Appl. No.: 11/852,221

(22) Filed: Sep. 7, 2007

(65) Prior Publication Data

US 2008/0062308 A1 Mar. 13, 2008

Related U.S. Application Data

(60) Provisional application No. 60/824,875, filed on Sep. 7, 2006, provisional application No. 60/824,878, filed on Sep. 7, 2006.

(51) Int. Cl.
*H04N 7/01* (2006.01)
*H04N 11/20* (2006.01)
*H04N 9/78* (2006.01)

(52) U.S. Cl.
USPC ............ 348/448; 348/450; 348/452; 348/665

(58) Field of Classification Search
USPC .......................................... 348/450, 452, 665
See application file for complete search history.

(56) References Cited

U.S. PATENT DOCUMENTS

| | | | |
|---|---|---|---|
| 6,434,196 B1 * | 8/2002 | Sethuraman et al. ..... | 375/240.12 |
| 6,563,550 B1 * | 5/2003 | Kahn et al. ..................... | 348/700 |
| 7,605,866 B2 * | 10/2009 | Conklin ........................ | 348/448 |
| 7,701,508 B2 * | 4/2010 | Wang et al. ................... | 348/452 |
| 7,787,048 B1 * | 8/2010 | Vojkovich et al. ............ | 348/452 |
| 8,115,866 B2 * | 2/2012 | Capps ........................... | 348/452 |
| 2003/0189667 A1 * | 10/2003 | Chow ........................... | 348/441 |
| 2005/0078215 A1 * | 4/2005 | Swartz ......................... | 348/452 |
| 2005/0110900 A1 * | 5/2005 | Brelay ......................... | 348/448 |
| 2006/0033839 A1 * | 2/2006 | Chao ............................ | 348/448 |
| 2006/0139486 A1 * | 6/2006 | Caviedes ..................... | 348/452 |
| 2007/0188662 A1 * | 8/2007 | Winger et al. ................ | 348/701 |

* cited by examiner

*Primary Examiner* — Mushfikh Alam
(74) *Attorney, Agent, or Firm* — Mima Abyad; W. James Brady; Frederick J. Telecky, Jr.

(57) ABSTRACT

Film mode detection with bad edit detection used in de-interlacing video includes use of combing artifact detection in both 3-2 pull down detection and 2-2 pull down detection. Further, combing artifact detection uses only two field memories by accumulation of partial field statistics for comparisons.

5 Claims, 18 Drawing Sheets

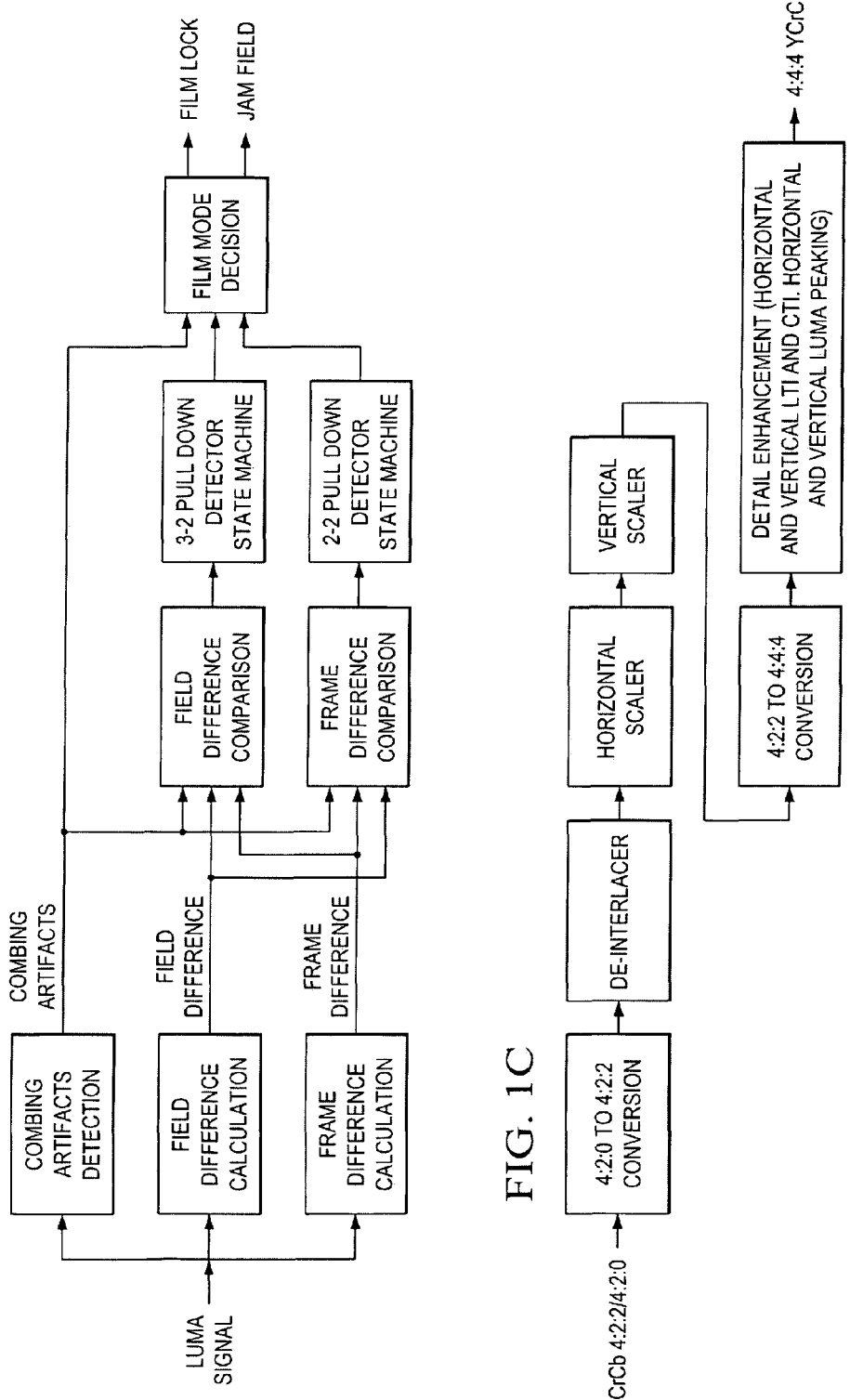

FILM MODE DETECTION

CROSS-REFERENCE TO RELATED APPLICATIONS

This application claims priority from and incorporates by reference provisional application Nos. 60/824,875 and 60/824,878, both filed Sep. 7, 2006. The following co-assigned copending patent applications disclose related subject matter: application Ser. No. 11/550,100, filed Oct. 17, 2006 and co-filed TI-62581 [Zhai+Chang].

BACKGROUND

The present invention relates to digital video signal processing, and more particularly to film mode and bad edit detection as is useful in de-interlacing video fields.

For moving picture systems, interlaced video format is widely used to reduce data rate. That is, each image frame consists of two fields, each of which contains samples of either the even numbered (top field) or the odd numbered (bottom field) lines of the image. In interlaced scan, fields are scanned and displayed sequentially, as shown for a 5×5 pixel portion in FIG. 7A. By taking advantage of the time it takes for an image to fade on a CRT, interlaced video gives the impression of double the actual refresh rate, which helps to prevent flicker that occurs when the monitor's CRT is driven at a low refresh rate, and allows the screen's phosphors to lose their excitation between sweeps of the electron gun. Interlaced scan achieves a good tradeoff between frame rate and transmission bandwidth requirements. However, when displaying video on a display that can support a high enough refresh rate so that flicker is not perceivable, progressive scanning is more preferable, since interlacing reduces the vertical display resolution and causes twitter effects for displaying pictures with high vertical frequency. In progressive scan, all frames as a whole are scanned and displayed continuously, as shown in FIG. 7B. Note that one frame, shown as in FIG. 7B, consists of two fields shown in FIG. 7A.

De-Interlacing

Due to the increased popularity of progressive displays, such as high-performance CRT/LCD/DLP/LCOS projectors, the new HDTV-ready TVs, and PC monitors, which can show progressive scanned images as opposed to interlaced, there is a need to display interlaced video on progressive displays. Thus, the function of converting interlaced video to progressive video, which is called de-interlacing, is very desirable. The task for de-interlacing is to convert the interlaced fields into progressive frames, which represent the same image as the corresponding input field but contain the samples of the missing lines as well. This process is illustrated in FIG. 7C, where the dash lines represent the missing lines in the interlaced video.

Mathematically, for a given interlaced input pixel values $F(j,i,n)$, the output pixel values from de-interlacing, $F_o(j,i,n)$, can be defined as $$F_o(j, i, n) = \begin{cases} F(j, i, n), & \mod(j, 2) = \mod(n, 2) \\ \hat{F}(j, i, n), & \text{otherwise} \end{cases}$$

where j, i, and n are the vertical, horizontal, and temporal index, respectively, $\hat{F}(j,i,n)$ is the estimation of the missing lines generated by the de-interlacing method, and $F(j,i,n)$ is the pixel value from the original interlaced field. That is, the existing, even or odd, lines in the original fields are directly transferred to the output frame.

Thus de-interlacing is a line-rate up-conversion process. From the signal processing point of view, the objective of de-interlacing is to preserve the baseband spectrum and suppress the "alias" introduced during up conversion as much as possible. This is not a straightforward linear upsampling problem, however, since TV signals do not fulfill the sampling theorem constraints (vertical prefiltering usually is not employed when the sensors in the camera sample the scene).

There are various ways to calculate the missing pixel $\hat{F}(j,i,n)$. Generally speaking, spatial (intra-frame), temporal (inter-frame), and spatial-temporal de-interlacing algorithms are simple and usually lead to poor conversion performance. Motion adaptive techniques are generally advantageous but of much higher complexity in implementation. Nevertheless, neither of these techniques can fully recover the lost information caused during interlacing because interlacing is a non-reversible procedure.

But the task of de-interlacing will be simple if the sources are progressive in nature. For example, most movies stored on DVD have an original source in the form of progressive frames. However, in order to be displayed on an interlaced scanned CRT TV, the sources are encoded as interlaced fields and then stored on DVD. This process to convert progressive frames into interlaced fields is called Telecine. During Telecine, the original progressive frames are divided into halves, thus no information is lost.

Differing from the native NTSC interlaced video material, where each field represents a unique snapshot in time, the two fields generated by Telecine are snapshots obtained at the same time instance. If which two fields belong to one frame can be correctly identified, we can recover the original film without any loss (of course, without introducing any artifacts as well).

NTSC Telecine (Conversion of 24 fps Film to 60 Hz NTSC TV)

Motion picture photography is based on 24 fps (frames per second). As NTSC TV standard runs at 60 interlaced fields per second, Telecine uses a process known as 3-2 pulldown to create 10 video fields from 4 film frames (24/4*10=60). This form of Telecine alternates between creating 3 fields from a film frame and 2 fields from another film frame, as shown in FIG. 7D.

Re-Interlacing 24 fps Film

For every film frame that had three fields made from it, the third field is a duplicate of the first, as shown in FIG. 7E. As discussed above, the objective of de-interlacing for film source is to correctly identify which two fields originated from one film picture and assemble them into one progressive frame. If our goal is to recover the film source and display it at its original rate of 24 fps, our job is done. However, if the reconstructed progressive frames need to be displayed at the speed of 60 frames per second, the progressive output should assemble 2 fields from each film frame and create a complete progressive frame that looks just like the original film frame, that is, we need to construct 5 frames from 5 fields, which were created from 2 film pictures during Telecine process. FIG. 7E illustrates the re-interleaving procedure, which alternates between doubling and tripling each frame (1, 1, 1, 2, 2, 3, 3, 3, 4, 4). Such interleaving pattern gives rise to the name "inverse 3-2 pull down" for this procedure.

De-Interlacing Other Sources

The above discussions cover how to generate 60 fields per second video sequences from 24 frames per second film source (Telecine) and how to recreate the 60 frames per second progressive video from it (de-interlacing). The two processes are also named 3-2 pull down and inverse 3-2 pull down, respectively, due to the represented fields/frame pattern during the conversions.

Besides 24 Hz film source, we also discuss another type of film source: True 30 frame per second material. For True 30 frame per second material, the same as for 24 Hz film material, interlaced fields are generated from the progressive film source and then stored. The two fields originated from one frame represent snapshots at the same time instance. If you want to recreate the original film frames from the interlaced video, we need to detect which two fields belong to the same progressive frame. As we are converting 60 fields per second sequence into 60 frames per second sequence in de-interlacing for this type of material, the field pattern is 2-2-2-2 as oppose to 3-2-3-2 for 24 Hz film source. For this reason, we name this type of de-interlacing 2-2 pulldown, where pairs of fields need to be woven together and each resulting progressive frame displayed twice.

Based on the above discussions, we can see that the key in de-interlacing for both types of film materials is to detect which two fields belong to the same progressive frame. This technique is called 3-2 pull down detection and 2-2 pull down detection, for the 24 Hz and 30 Hz film materials, respectively.

General Techniques for 3-2 and 2-2 Pull Down Detection

Based on the above discussion, different from regular interlaced sequences, where all fields are snapshots taken at different time instances, the two fields that originated from one film frame represent snapshots at the same time instance. This difference will be used to distinguish film source from regular interlaced source.

It is easy to understand that the two fields representing the same time instances are more correlated (similar) than two representing different time instances. Hence, for 2-2 pull down film source, as shown in FIG. 7F, if we measure the correlation (or differences) between the neighboring fields, the resulting correlation should follow in the pattern of "strong, weak, strong, weak, . . . ", where strong correlation is associated with the two fields that are originated from one progressive film frame. As shown in FIG. 7F, we can use the differences of two fields to denote the level of correlation and compare those field differences with some threshold, then the comparison results will be in the pattern of "1, 0, 1, 0, . . . ", if the source is 2-2 pull down.

As for 3-2 pull down source, as mentioned above, one field from every other progressive film needs to be repeated during telecine procedure, in order to meet the required field rate for the resulting interlaced video. For example, as shown in FIG. 7F, Field 3 and Field 5 should be the same fields originated from film frame 2. Note that the old numbered fields in FIG. 7F should be with the same field parity, that is, they are all odd fields or even fields. So if we measure the field differences of two neighboring fields with the same parity, the difference between field 3 and 5 should be very small, so is the difference between field 8 and 10, and between field 13 and 15. The other differences should be much larger compared to those small differences. Thus, for 3-2 pull down detection, we usually calculate the differences of two neighboring fields with the same parity and compare these differences with a threshold. If it is a 3-2 pull down film source, the comparison results should follow the pattern of "1, 1, 1, 1, 0, 1, 1, 1, 1, 0, . . . ".

Challenges

So far, the task of 2-2 pull down and 3-2 pull down detection seems rather simple. It is not quite true, however, due to a few challenges as set forth below.

(1) The two neighboring fields used for comparison in 2-2 pull down detection have different field parity (that is, one is an odd field and the other one is an even field), thus, they always correspond to snapshots at different spatial locations. For this reason, although the two fields originated from one film frame represent snapshots at the same time instance, their difference may not be as small as expected. This makes the comparison results harder to follow the "1, 0, 1, 0, . . . " pattern, even though the source is indeed 2-2 pull down, since the small differences and large differences may not be that distinguishable.

(2) Even if the comparison results of neighboring fields with the same parity follow the "1, 0, 1, 0, . . . " pattern, it is still not guaranteed that the detected video is a true 2-2 pull down source, because in theory, an interlaced video sequence may also have the same pattern.

(3) As for 3-2 pull down, as mentioned above, the repeated fields (e.g., field 3 and 5 in FIG. 7F) should be exactly the same in theory, as they are the same field originated from film frame 2. This is true if field 5 is not stored during the Telecine procedure. The MPEG-2 standard defines a flag called "repeat_first_field" to handle this. If such a flag is detected during decoding, field 5 can be repeated using field 3 at the receiver, so these two fields will be exactly the same. However, if field 5 is encoded and stored, although the original sources for field 3 and 5 are the same, the resulting two reconstructed fields are different because of the use of different lossy compressions (e.g, the rate control may assign different quantizers to these two fields, or they may have been assigned different reference frame during motion compensation). In addition, if the video is decoded and transmitted to the receiver through an analog channel, the introduced transmission noise will make these two fields quite different. All these possibilities bring difficulties in identifying the two fields that are supposed to be the same in theory.

(4) The techniques for 3-2 and 2-2 pull down detection discussed in the previous section are for ideal sources. In reality, however, there exist plenty of mixture that consist of both film source and interlaced video source due to video editing. For example, when a movie is transferred to video for broadcasting or distribution on DVD, an entirely new electronic end title sequence may be created. Or when the movie is displayed on TV, the added weather alert broadcast is usually 30 fps interlaced video. In this case, the film mode detector may be confused when it tries to detect and hold a 3-2 or 2-2 sequence.

(5) During video editing, film can be concatenated with any other source such as a video source or another film source, which may cause the original cadence to break. You might get a 2-2 or 3-3, or 4-1 cadence to name just a few of the possibilities. Errors occur during transition from one source to another source if the same cadence is still used for re-interleaving. These errors will show up as artifacts on screen. The most common artifact, a comb, happens when the video processor combines two fields of video that come from two different frames of film. FIG. 9 shows an example of what a comb would look like on screen. The functionality to detect such transition is called bad edit detection. If such field transition is detected, the processor will switch to the real video de-interlacing method instead of using re-interleaving. All de-interlacing methods switch between film and video, but the strength lies in how quickly you can detect the error and switch. Many de-interlacers switch after it is too late. The goal is to switch to video mode before an artifact is observable and to switch back to film mode as quickly as possible.

Challenges 1 and 3 mainly relate to film mode detection itself, and challenges 2, 4, and 5 directly relate to bad edit or mixed content detection. Next we briefly discuss some conventional 3-2 pull down and 2-2 pull down detection algorithms and implementations.

3-2 Pull Down Detection

As discussed above, the cadence of field differences between two successive fields of the same parity follows a particular pattern, if the source is 3-2 pull down. The field differences can be directly calculated as shown in FIGS. 8A-8B, where the schemes search for the particular pattern of the resulting field difference cadence. Field differences can also be indirectly measured using other characteristics such as motion vectors if they are available (e.g. from the MPEG bitstream).

As these implementations solely rely on the detected cadence of field differences, they are incapable of handling the aforementioned challenges such as mixed content and bad edit, even though they usually can handle pure and clean 3-2 pull down source very well.

As for 2-2 pull down detection, FIG. 8C shows one example implemented in U.S. Pat. No. 6,859,237. The field difference (the difference between two neighboring fields with different parity) is put into a block called field rate accumulator which accumulates the field differences of one field. Its output, A, and its one-field delayed output, B, are then compared. In order to be robust, A and B are not directly compared. Instead, the relative difference, i.e., their difference divided by their average is used to compare with a threshold, the minimum ratio. If the relative difference is greater than the chosen minimum ratio, the field difference comparison results, i.e., the output of the AND gate, will be 1 or 0. The sequence of the field difference comparison results will be sent to a state machine, which searches for "01" pattern as discussed above, to decide if the sequence is a 2-2 pull down film source and the phase of each field (i.e which two fields belong to one progressive frame) when it is.

Film Mode Detection Employing Combing Artifacts Detection

Combing artifacts detection has been employed in film mode detection with the goal to identify bad edit or mixed content edit. For example, in U.S. Pat. No. 6,859,237, a sawtooth artifact detector is employed to detect bad edits. The goal there is to detect the mixed content (e.g., 60i video overlaid on 24 Hz film), but the technique can be directly used for bad edit detection as well.

SUMMARY OF THE INVENTION

The present invention provides film mode detection with pull down detection which incorporates combing artifact measures.

BRIEF DESCRIPTION OF THE DRAWINGS

FIGS. 1A-1C show a preferred embodiment film mode detection and system processor.

DESCRIPTION OF THE PREFERRED EMBODIMENTS

1. Overview

Figures 1, 1B:
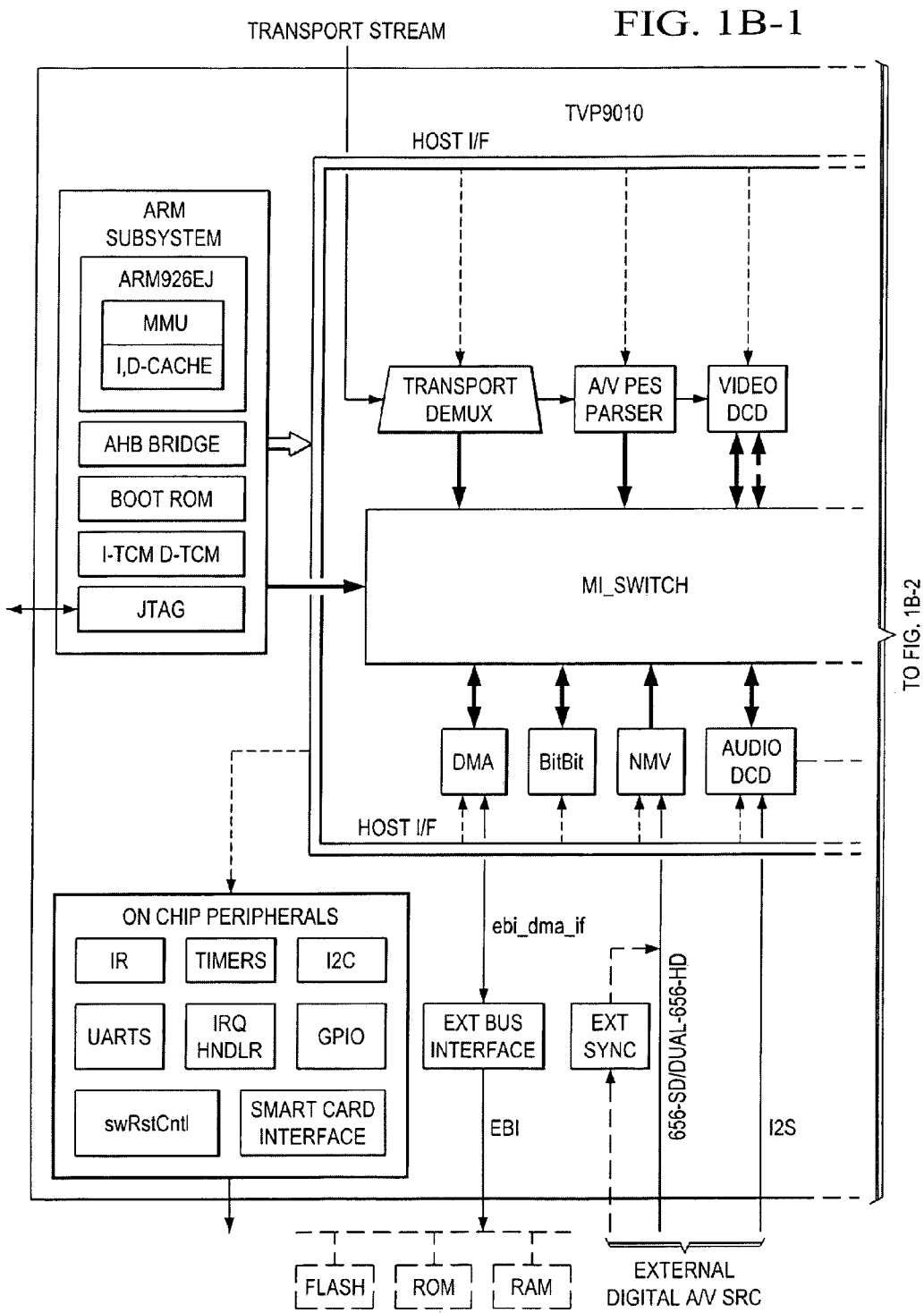
Figures 1, 1B, 2:
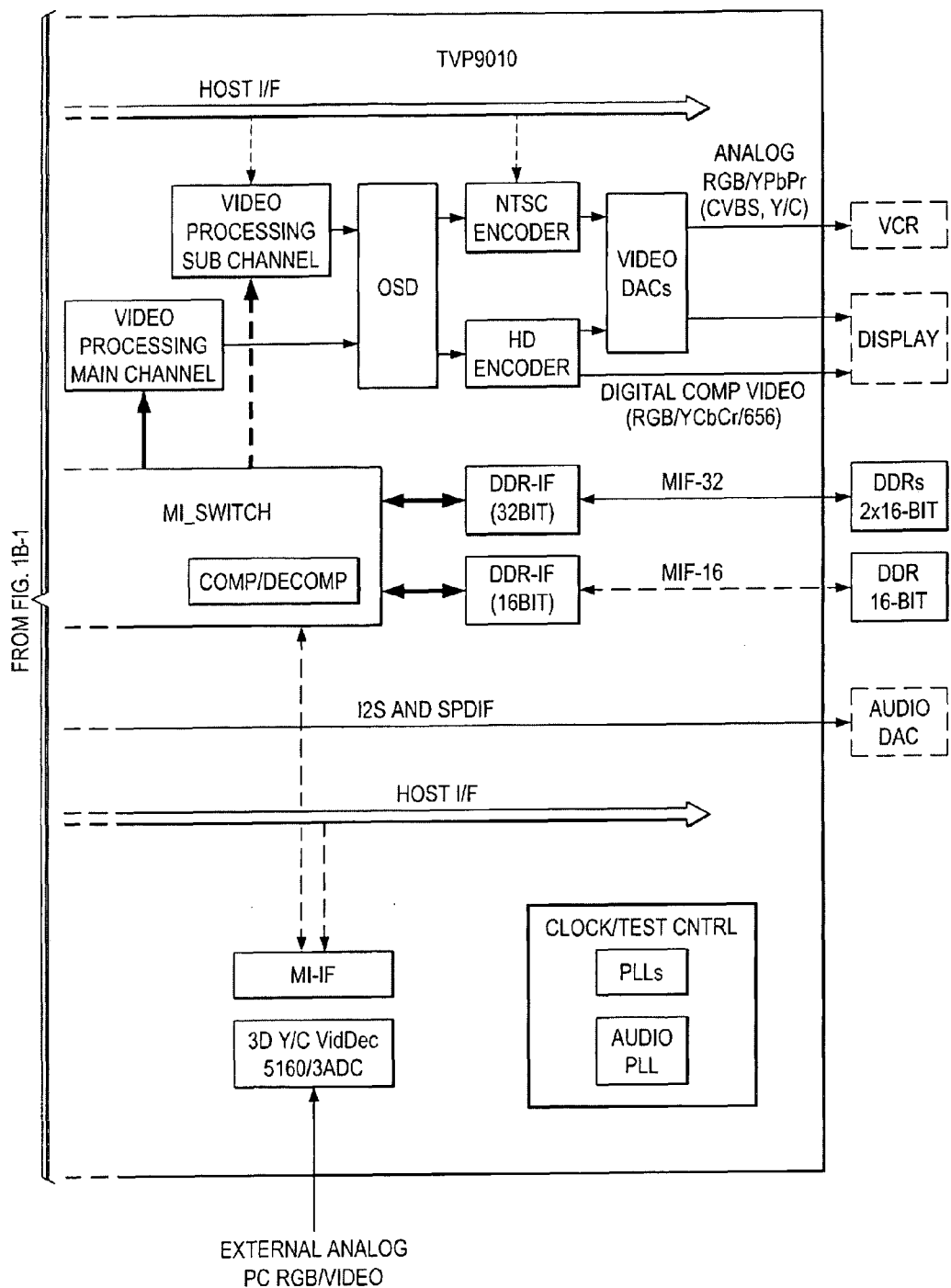
Figure 3:
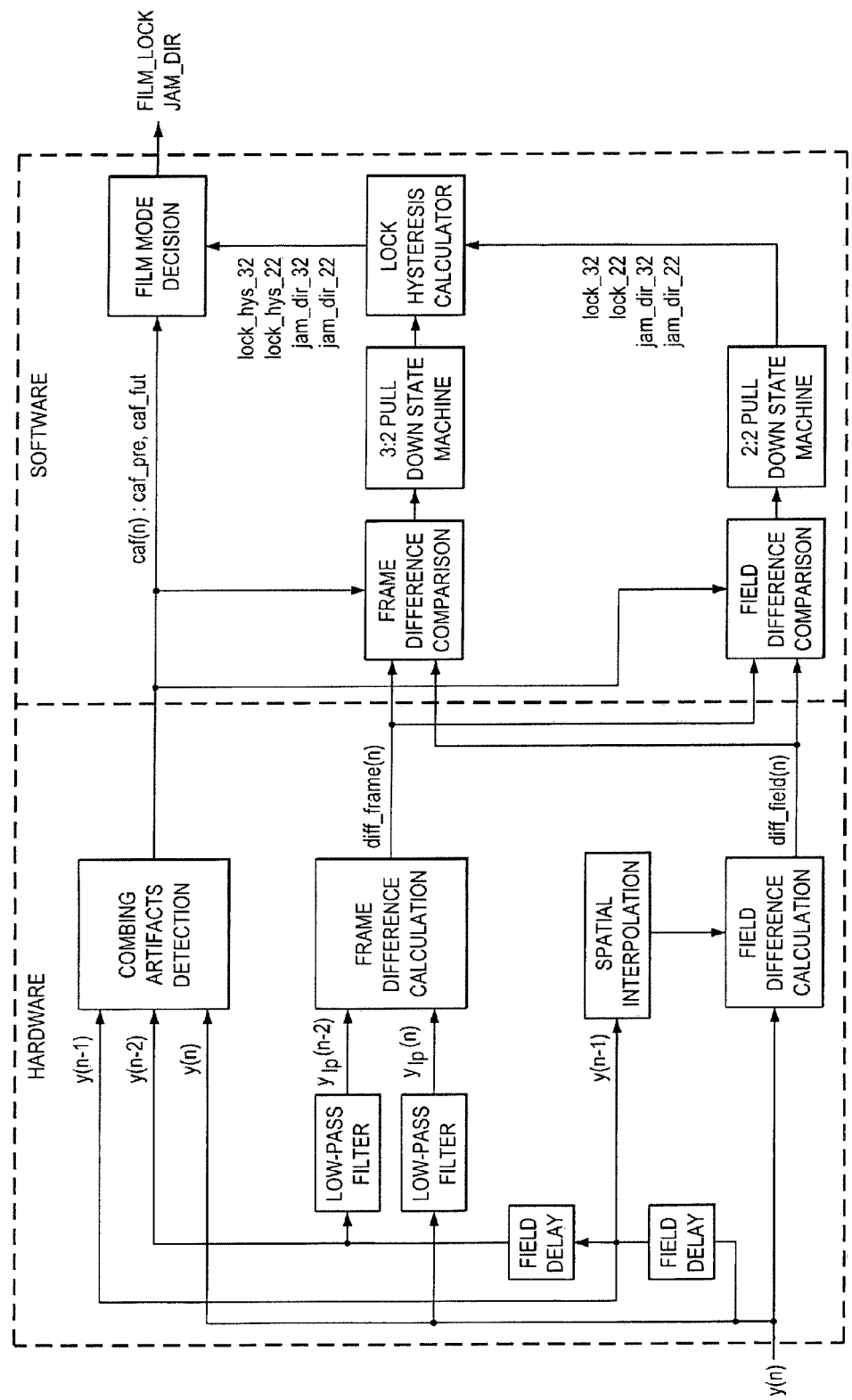
FIG. 3 shows a preferred embodiment implementation.
Figure 6:
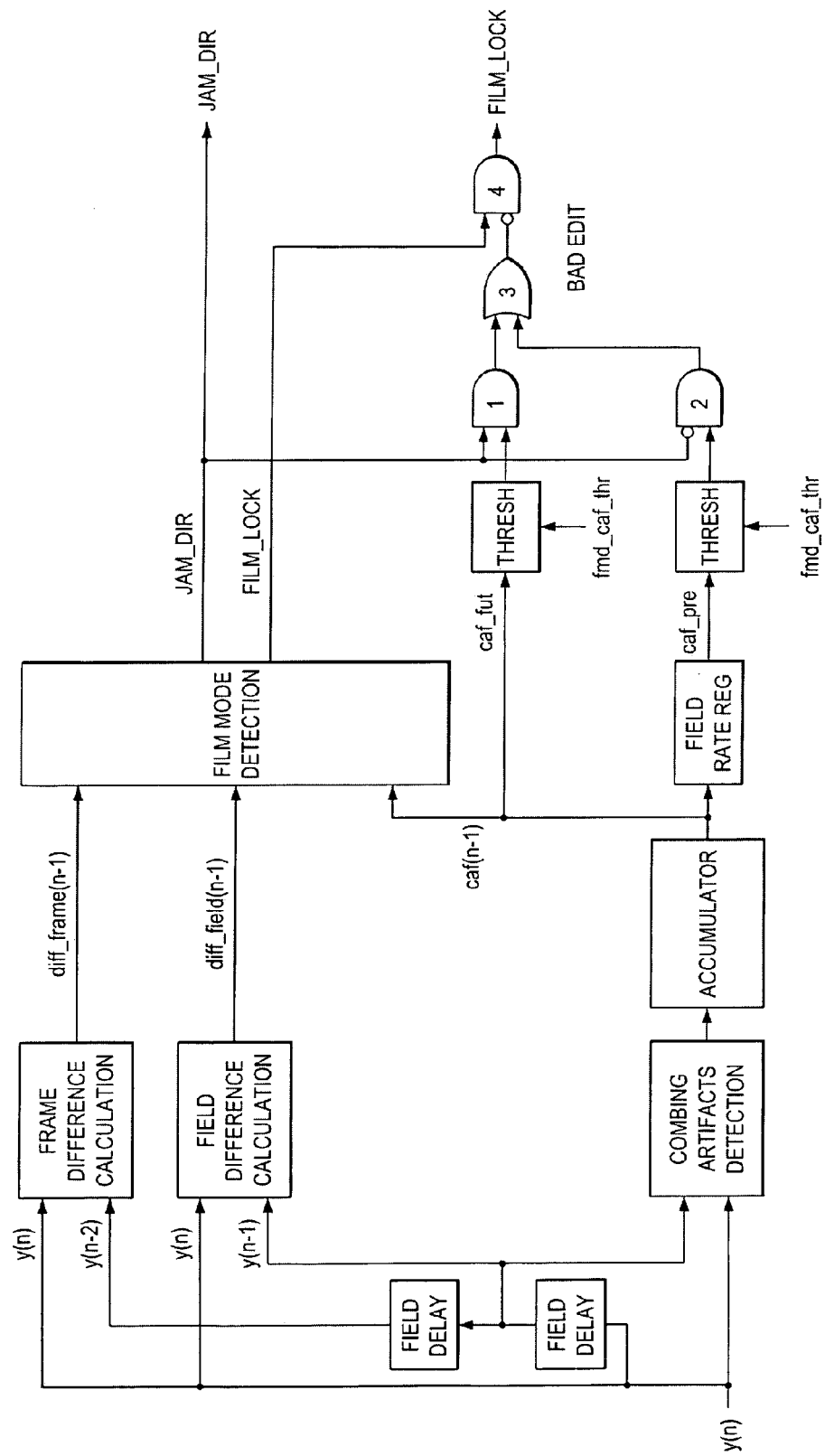
FIG. 6 shows another preferred embodiment implementation.
Figure 7A:
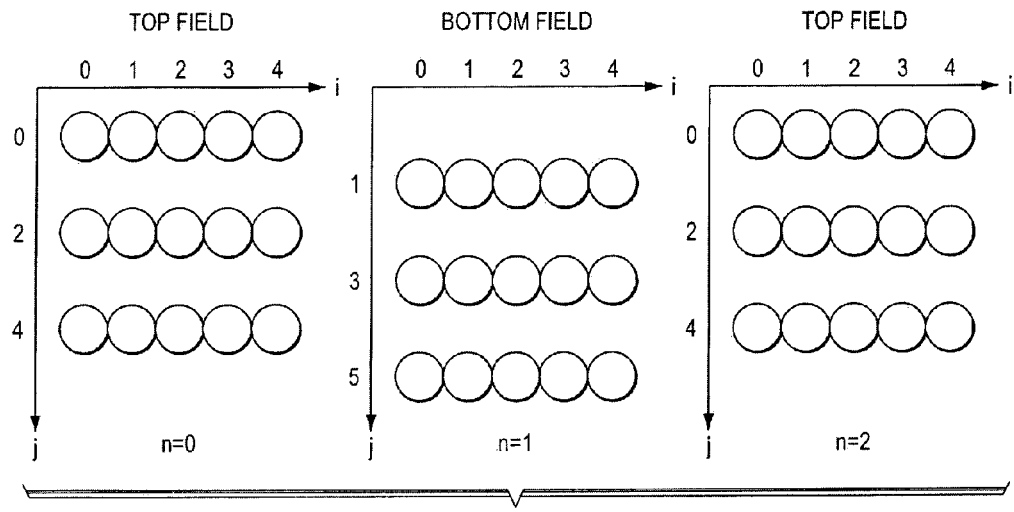
FIGS. 7A-7F are prior art pixel processing.
Figure 7B:
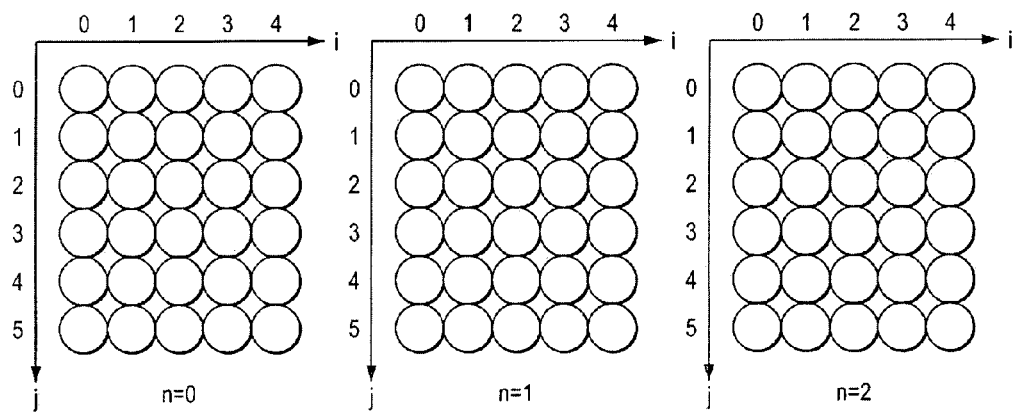
Figure 7C:
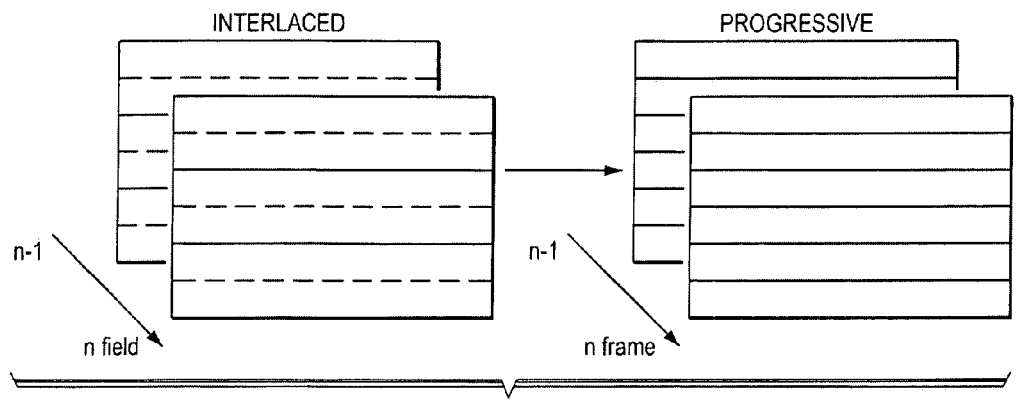

Preferred embodiment methods perform film mode detection with pull down detection which incorporates combing artifact measures. Further preferred embodiments provide bad edit and mixed content detection when only a two-field memory is available by accumulation of partial field combing artifact measures. FIGS. 1, 3, and 6 illustrate preferred embodiment film mode detectors implementing preferred embodiment methods.

Preferred embodiment systems perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators. FIG. 1B illustrates functional blocks of a processor with FIG. 1C showing details of the display processing, including de-interleaving. A stored program in an onboard or external (flash EEP)ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet.

2. Film Mode Detection

The background indicates that the three major inputs used to perform film mode detection are (1) field difference (difference between two neighboring fields with different field parity), (2) frame difference (difference between two closest fields with the same field parity), and (3) the combing artifacts when two consecutive fields are jammed together. The combing artifacts detection logic aims to detect the combing artifacts when two neighboring fields are jammed together, which is caused by mixed content or bad edit. As shown in top-level block diagram in FIG. 1A, the first preferred embodiment has both the 3-2 and 2-2 pull down state machines make use of not only field differences and frame differences but also make use of detected combing artifacts to achieve accurate and reliable detection. Note that this differs from the apparatus in U.S. Pat. No. 6,859,237, cited in the background, where 3-2 pull down and 2-2 pull down state machines are designed without the knowledge of combing artifacts detection. In that approach, results detected by combing artifacts are used after the stage of 3-2 and 2-2 pull down state machines, i.e., used to provide further protection in case of bad edit. In contrast, the first preferred embodiment film mode detection includes feeding combing artifacts results into the early stages of both 3-2 and 2-2 pull down state machines, as well as the film mode decision stage for further protection. The following paragraphs explain the detail of each block in FIG. 1A.

(a) Frame Difference Calculation

The block of frame difference calculation is to calculate the difference between two closest fields with the same parity, and we call it frame difference since the time delay between these two fields is 1 frame time interval. The simplest way to calculate frame difference is to sum up all the differences between each pair of pixels in the same spatial position of the two fields. However, as discussed above, noise can be introduced during the stages of picture capture, encoding, transmission, and the post-processing procedures. Thus, low pass filtering is usually necessary in order for the detection to be more robust to noise. Next, we discuss our implementation of this block.

(1) Low-Pass Filtering

Figure 2A:
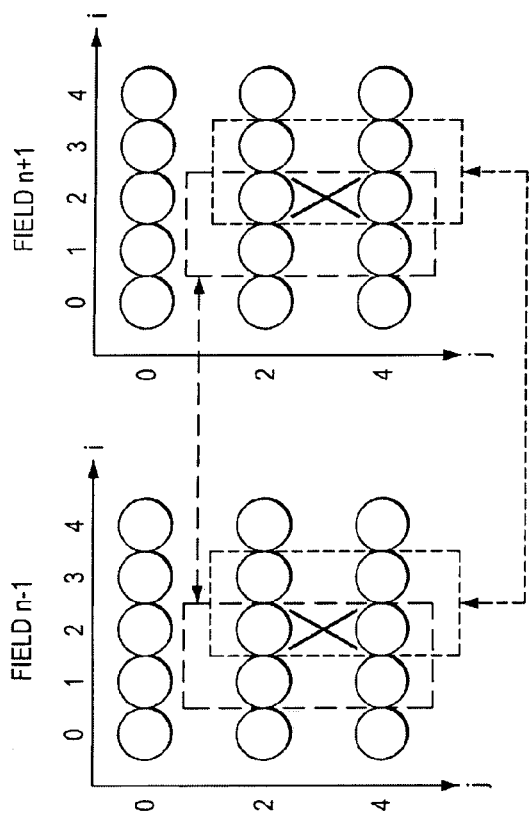
FIGS. 2A-2H illustrate pixel processing.

Although various types of low pass filters can be used, we employ a very simple one as illustrated in FIG. 2A, where the following 2×2 average filter is used and where y(j,i, n) denotes the luma of the pixel located at (j, i) in the n-th frame. Note that preferred embodiments are not limited to the use of any particular realization of low pass filtering.

$$y_{lp}(j, i, n) = \frac{1}{4} \sum_{0 \le m \le 1, -1 \le k \le 0} y(j+m, i+k, n)$$

(2) Motion Calculation

We first calculate the pixel difference using the low-pass filtered luma $y_{lp}$ and right shift it by 4 bits (i.e., divide by 16 without round-off) as shown below:

$$\text{diff\_pix}(j, i, n) = \left[ \sum_{0 \le k \le 1} |y_{lp}(j, i+k, n-1) - y_{lp}(j, i+k, n+1)| \right] >> 4$$

The pixel coverage of this operation is shown in FIG. 2A. The measure of motion ("mv" for motion value) of each pixel mv(j,i,n) is then obtained by saturating the pixel difference diff_pix(j,i,n) to 15:

$$mv(j, i, n) = \begin{cases} 15 & \text{when diff\_pix}(j, i, n) > 15 \\ \text{diff\_pix}(j, i, n) & \text{otherwise} \end{cases}$$

The frame difference diff_frame(n) is the obtained by adding all the pixels' motion values of each field as follows:

$$\text{diff\_frame}(n) = \sum_{i,j} mv(j, i, n)$$

Figure 2B:
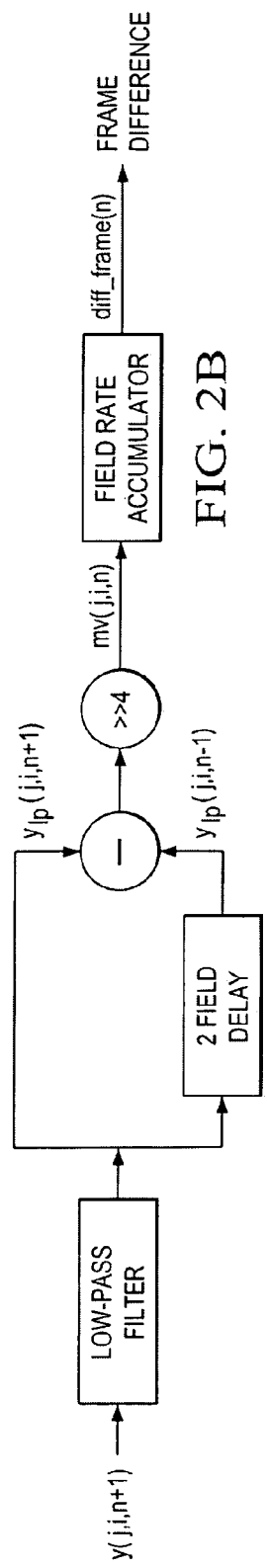

An implementation can be seen in FIG. 2B.

(b) Field Difference Calculation

Figure 2C:
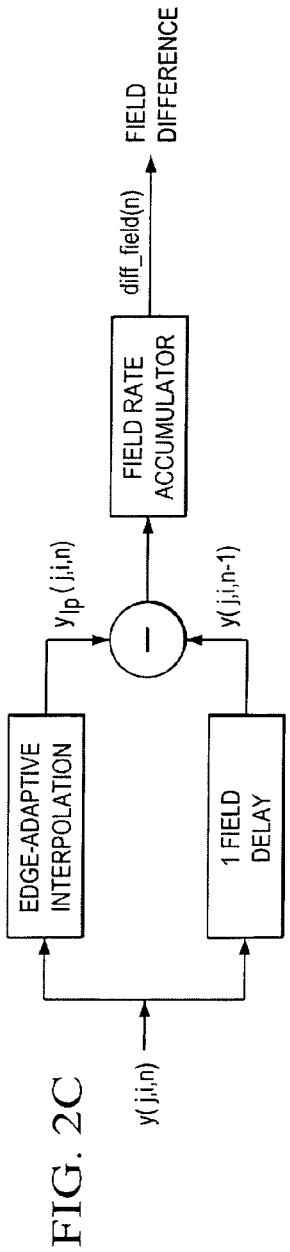

The block in FIG. 1A of field difference calculation measures the correlation between two neighboring fields with different parities. More precisely, it is to measure the temporal correlation between the two fields. Because the two fields correspond to different spatial locations, a direct subtraction of the two fields is not a good indicator for temporal correlation. A more reliable way is to calculate the difference between two fields corresponding to the same spatial locations. In order to achieve this, one field needs to be re-sampled in the spatial domain to reflect its representation at the opposite field parity. That is, for the comparison of one top field and one bottom field, either the top field needs to be re-sampled to obtain its representation at the bottom field locations, or the bottom field needs to be re-sampled to obtain its representation at the top field locations. Then the difference between these two fields will carry only the information of temporal correlation, which is what we need in the film mode detection. Since the needed samples of each field at the locations of opposite field parity is right in the middle of each pair of vertical pixels, it can be obtained by vertical interpolation. Simple vertical interpolations such as the vertical average implementation can achieve this, although more complicated interpolation techniques, e.g., edge-adaptive interpolation, usually lead to a more precise result. In this implementation, the edge-adaptive interpolation technique of cross-referenced application Ser. No. 11/550,100 is employed. But the first preferred embodiments are not limited to the use of any specific implantation of the spatial interpolation. Thus the field difference can be calculated as $$\text{diff\_field}(n) = \sum_{i,j} [y_{inp}(j, i, n) - y(j, i, n-1)]$$

where $y_{inp}$(j,i,n) is the spatially interpolated pixel which corresponds to the opposite field parity representation of y(j,i,n). The block diagram of the implementation is shown in FIG. 2C.

(c) Combing Artifacts Detection

The combing artifacts detection logic aims at measuring the combing artifacts when two neighboring fields are jammed together. Merging together two fields that correspond to different time instances typically result in spatial discontinuity (vertical discontinuity in this case). One example can be seen in FIG. 9.

Figure 2E:
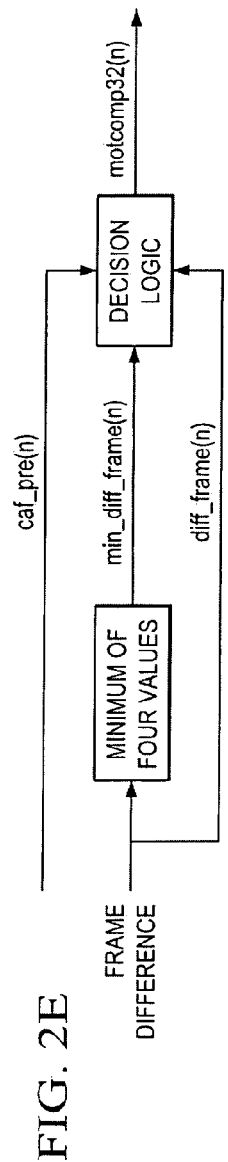
Figure 2D:
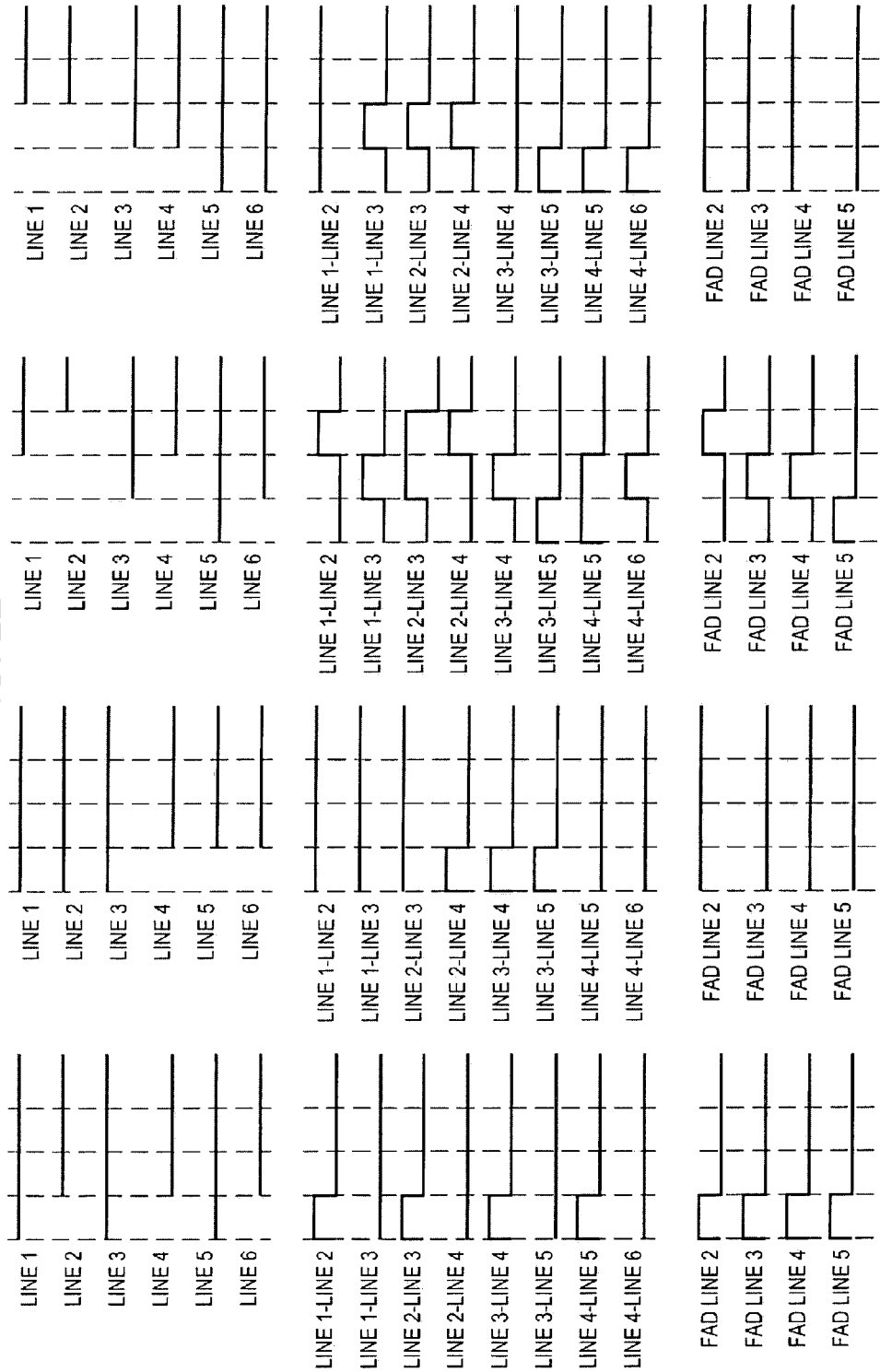

Four different cases of field jams are illustrated in FIG. 2D, where the jams of the second and fourth columns have no combing artifacts caused by jamming, whereas the jams of the first and third columns do have combing artifacts. The combing artifacts detection logic must be able to differentiate the second and fourth columns from the first and third columns. There are various ways to detect such vertical discontinuities. One example is the sawtooth detection scheme described as (e.g., U.S. Pat. No. 5,625,421):

```
If ( |y(i,j-1) - y(i,j)| > Th1 && | y(i,j-1) - y(i,j+1)| < Th2)
    caf(i,j) = 1; // Combing artifacts detected
else
    caf(i,j) = 0; // No combing artifacts detected
```

The two thresholds, Th1 and Th2, are set as Th1>Th2. Th2 is small because the comparison is sensitive to changes—the arrangement is looking for two pixels close to each other. So the threshold is chosen to be above noise but low enough to detect visible artifacts. The detected caf(i,j) then passes a horizontal minimum operation such that one pixel detected as sawtooth must have a minimum horizontal duration of two pixels. The number of sawtooths on one line is then divided by the number of moving horizontal edges for that line (simply measured by the horizontal transitions in each line enabled by detected motion). The sawtooth/moving edges ratio is then compared with a threshold to get caf(i,j)=1 if it is greater than the threshold and 0 if otherwise. This counter is then accumulated vertically, and the total value of each field is then compared with a threshold for final determination of combing artifact for each field. The definition of this threshold heavily affects the performance of this technique. For example, in the case of mixed content, combing artifacts may only occur in a small portion of the picture and thus the sum of the sawtooth/moving-edge ratio per frame may not exceed the threshold if the threshold is set at a value too large. On the other hand, if the threshold is defined too small, misdetection becomes more likely if the texture has similar pattern as combing artifacts.

Another implementation of combing artifacts detection is given as (e.g., cross-referenced application Ser. No. 11/550,100):

$$y_s(i, j, n) = \sum_{u=-2}^{2} y(i+u, j, n)$$

$$c_+(i, j) = \max_{k=-2,0,2} y_s(i, j+k) - \min_{k=-1,1,3} y_s(i, j+k)$$

$$c_-(i, j) = \min_{k=-2,0,2} y_s(i, j+k) - \max_{k=-1,1,3} y_s(i, j+k)$$

And the overall level of combing artifacts for one pixel is defined as the maximum of the two phases of combing:

$$c(i,j)=\max[c_-(i,j),c_-(i,j)]$$

The level of combing artifacts of a frame is defined as the maximum combing artifact level weighted by motion value for a frame as:

$$C(n) = \max_{i,j}[c(i, j, n)w(i, j, n)]$$

where the weighting coefficients $$w(i, j, n) = \frac{1}{256}|y(i, j, n) - y(i, j, n-2)|$$

are calculated proportional to motion values. Due to the use of the maximum operator, this scheme is very sensitive to combing artifacts detected in a small area. This is beneficial for accurate detection of mixed content, e.g., when video mode caption is overlaid on film source, where the combing artifacts may appear only in a small part of the picture while the reset area shows no combing. However, the high sensitivity to small area combing artifacts may easily lead to misdetection if the source itself has texture that resembles combing artifacts.

The first preferred embodiments are not limited to any specific implementation of combing artifacts detection, as this function may be a plug-in block. Any design that is able to reliably and accurately detect the vertical discontinuity due to merging (jamming) two fields at different time instants can be employed.

(d) Frame Difference Comparison

FIG. 2E is a block diagram of frame difference comparison logic. The inputs to the block are the frame difference diff_frame(n) and the combing artifacts caf_pre(n), which is the combing artifacts when the current field and its previous field are jammed together. The "Minimum of four values" block outputs variable min_pre_diff_frame(n) given as.

$$\text{min\_pre\_diff\_frame}(n)=\min\{\text{diff\_frame}(i)|i=n\,4, n\,3, n\,2, n\,1\}$$

The "Decision Logic" block will then take the three inputs caf_pre(n), diff_frame(n), and min_pre_diff_frame(n) and output the motion comparison result motcmp32(n), which is the input to the 3-2 pull down detection state machine.

The Decision Logic block can implement the following pseudocode:

```
1  if ( diff_frame>fmd_diff_frame_thr2
2     || (!state23_sh && diff_frame>2*min_pre_diff_frame && diff_frame>fmd_diff_frame_thr)
3     || (state23_sh && ((diff_frame>min_pre_diff_frame && (!lock_32 ||
4                                          lock_32 &&diff_frame>fmd_diff_frame_thr)
5                       )||
6                       caf_pre>fmd_32_caf_thr
7                       )
8          )
9     )
10         motcmp32 = 1;
11 else
12         motcmp32 = 0;
```

The thresholds fmd_diff_frame_thr and fmd_diff_frame_thr2 are used for frame difference comparison, with fmd_diff_frame_thr2 taken as much greater than fmd_diff_frame_thr. The other threshold, fmd_32_caf_thr, is used to determine whether the combing artifacts caf_pre is significant enough to justify a bad edit or mixed content decision. The default values of the thresholds fmd_diff_frame_thr, fmd_diff_frame_thr2, and fmd_32_caf_thr are set as 16, 896, and 1024, respectively, for standard definition (SD) video (i.e., each field's dimension is 720×240).

In line 2 of the pseudocode the variable "state23_sh" denotes the current state in the 3-2 state machine. We will describe it below, but at this point, keep in mind that it indicates the state that "diff_frame" should be small if the source is 3-2 pull down. When the variable "lock_32" is 1, it means the state machine is locked to 3-2 pull down mode.

We can see from line 1 that fmd_diff_frame_thr2 serves as the upper bound for the minimum diff_frame (i.e., the frame difference that corresponds to the two same fields). As shown in line 2 and 3, different conditions are set for "state23_sh" state (when diff_frame is supposed to be small if it is 3-2 film source) and the other states. As shown in line 2, when state23_sh is 0 (diff_frame should be large if it is 3-2 film source), the condition for motcmp32 to be 1 is that diff_frame must be greater than fmd_diff_frame_thr and also greater than twice min_pre_diff_frame. However, when state23_sh is 1, we want to be more cautious to set motcmp32 as 0 (that is, more aggressively to set motcmp32 as 1). First, as shown in line 6, if the associated combing artifact, caf_pre, is greater than fmd_32_caf_thr, we want to set motcmp32 as 1, because the combing artifacts are supposed to be very small at this state if the field source is a 3-2 pull down source. Second, we also want to make sure that diff_frame is relatively small if we want to set motcmp32 as 0. As shown in line 3, when the 3-2 pull down state machine is not locked to film mode (lock_32=0), and diff_frame is greater than min_pre_diff_frame, motcmp32 will be set as 1. As shown in line 4, when the 3-2 pull down state machine is locked to film mode (lock_32=1), in addition to the condition "diff_frame>min_pre_diff_frame", diff_frame must be greater than the threshold fmd_diff_frame_thr to set motcmp32 as 1. The reason for setting different conditions with respect to lock_32 is because (1) we prefer to enter film mode (lock_32 transits from 0 to 1) conservatively; (2) when the 3-2 state machine is already locked to film mode (lock_32=1), we prefer to keep staying at film mode, that is, we leave film mode (motcmp32 is set as 1 at state 2:3, that state23_sh is 1) not only when diff_frame>min_pre_diff_frame but also when diff_frame>fmd_diff_frame_thr.

Figure 8A:
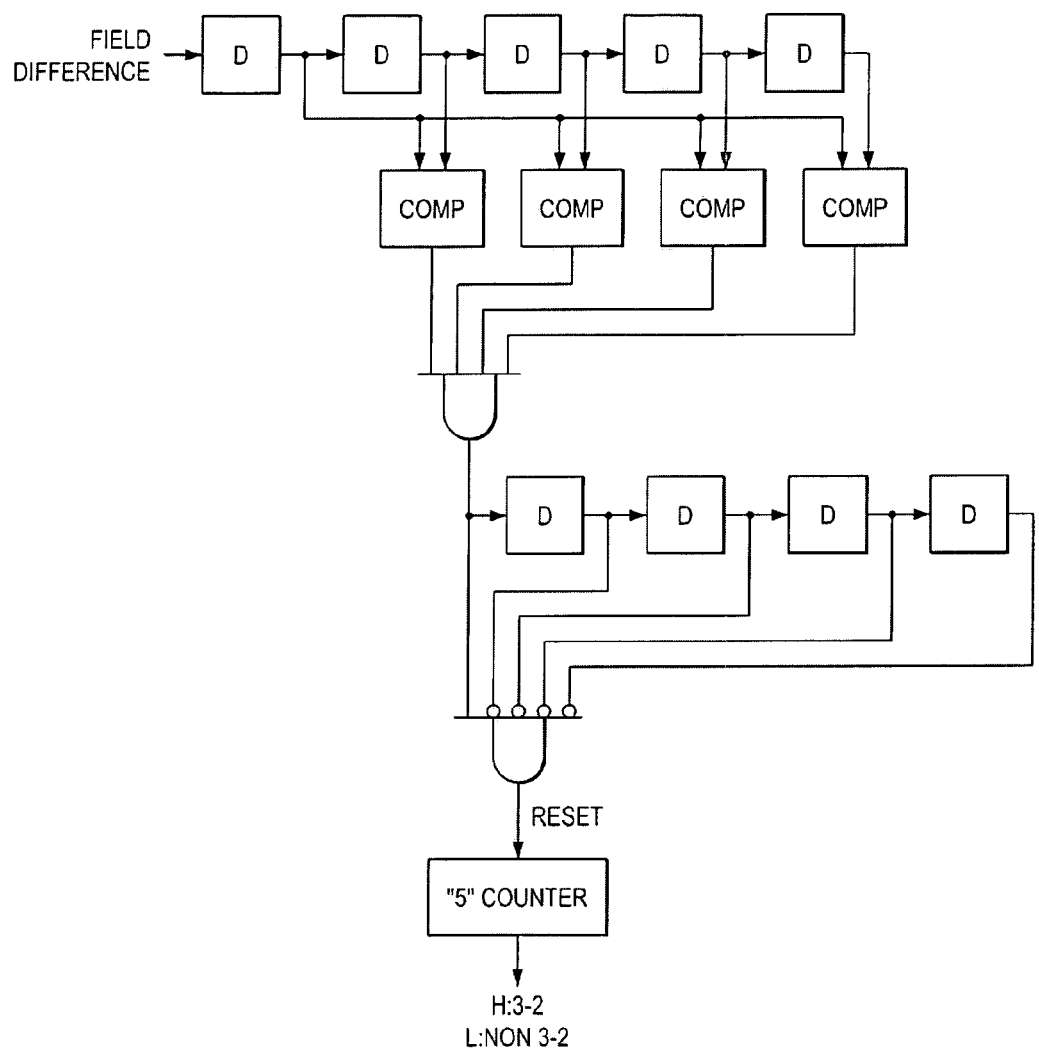
FIGS. 8A-8C show prior art implementations.
Figure 8B:
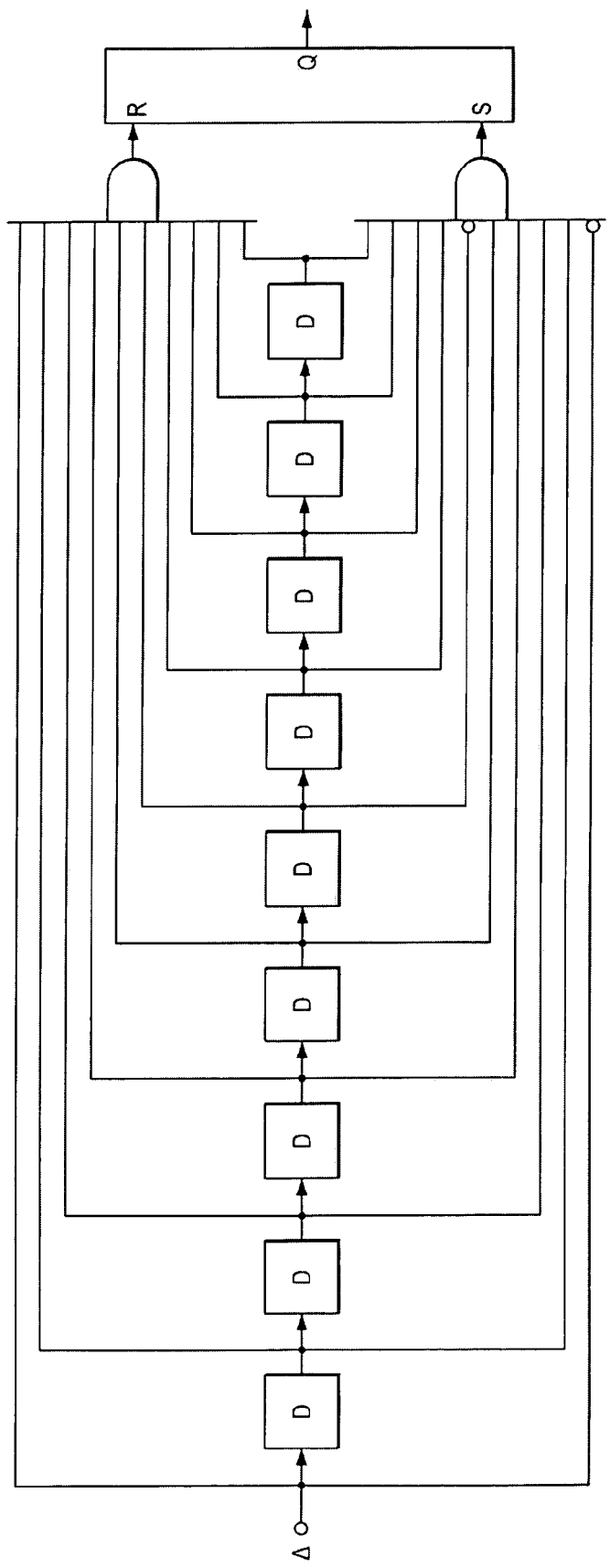
Figure 8C:
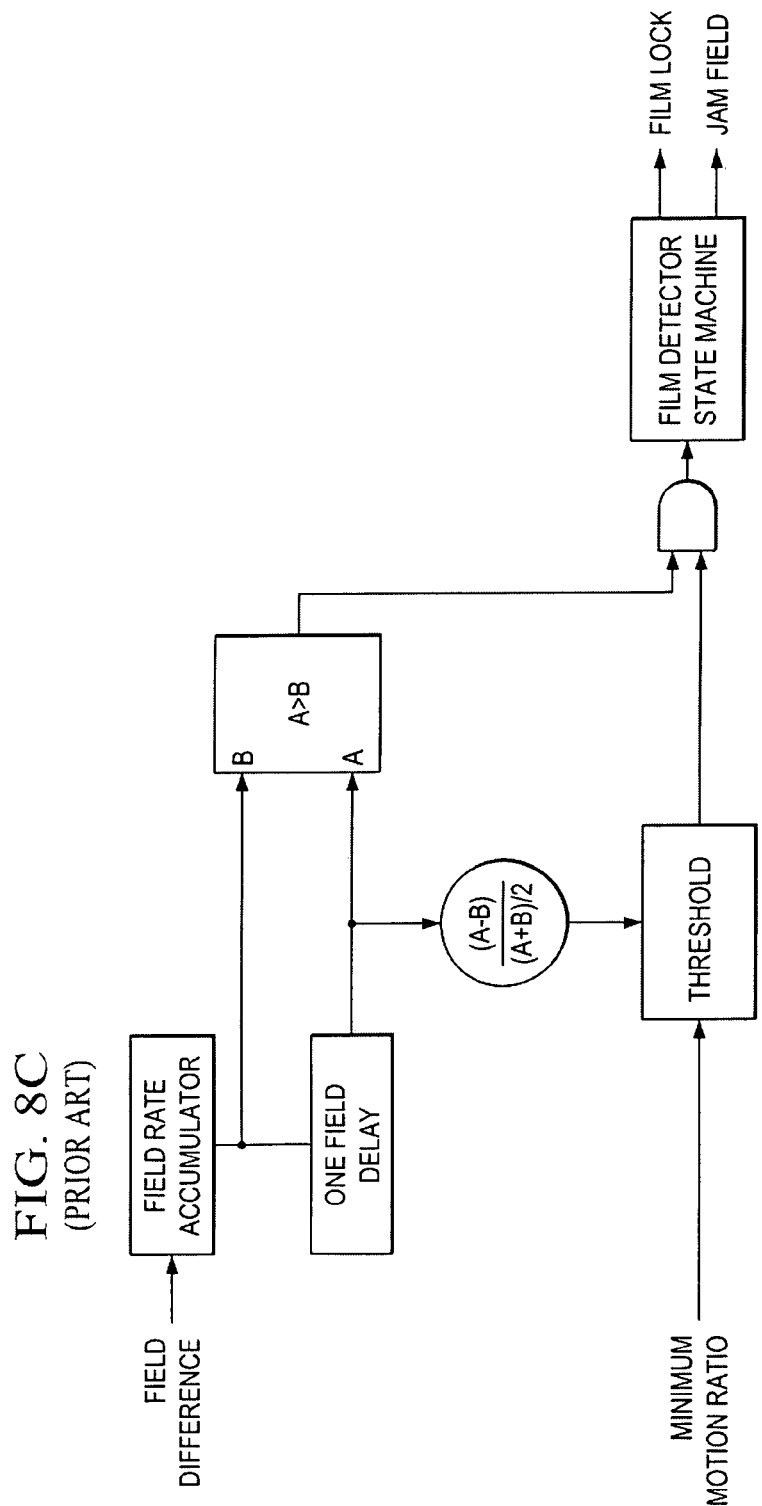

This decision logic provides a very reliable justification of the minimum frame difference. The reasons are twofold. First, compared to the traditional techniques, such as those in FIGS. 8A-8B, the first preferred embodiments do not rely on absolute comparison results of frame differences, instead they count the relative comparison results. Thus they can reliably handle slow motion and still video sequences, because the frame differences that correspond to 1 (big) and 0 (small) are hardly differentiable in this case. Also they are robust, since noise or compression may flip the frame difference comparison result, especially when video has very slow motion. For example, the two fields that are supposed to be the same might be quite different due to the introduced noise (for example, during transmission) or different compression ratios in compression. The first preferred embodiments also take into account the sensitivity of the comparison results of diff_frame with respect to the status of state machine. As discussed above, we set different conditions for the justification at different states of the state machine, so that the first preferred embodiments can handle slow motion video very well.

(e) Field Difference Comparison

We next discuss the field difference comparison logic, which implements the following pseudocode.

significantly less than diff_field_1fd (1.5*diff_field<diff_field_1fd) and caf_pre is relatively small (caf_pre<fmd_22_caf_thr2), motcmp22 is set as 0. Lines 3 to 6 are used to deal with slow motion or still sequences. Line 3 means diff_field<diff_field_1fd and diff_frame is small (slow motion). Line 4 means diff_field can be a little bit larger than diff_field_1fd and diff_frame is very small (very slow motion), where fmd_diff_frame_thr is a very small value. We set motcmp22 at 0, when either line 3 or 4 is true, and the associated CAF is small, which is line 6.

As discussed previously, 2-2 pull down detection is usually much more difficult than 3-2 pull down detection due to two reasons: (1) It is harder to reliably and accurately measure field difference than frame difference; and (2) it is more likely that interlaced video sequence may have the "1010" cadence of field difference. In addition, in frame difference comparison logic, all frame differences are compared to the smallest one, whose value should be quite small since it corresponds to the difference of the two fields which are supposed to be the same (ideally it should be 0). However, in field difference comparison logic, there is no such common base, which makes field difference comparison even more difficult. For this reason, we prefer to be more conservative in the field difference comparison logic. Differing from frame difference comparison logic, when the condition for motcmp22=0 (generally speaking, diff_field is much smaller than diff_field_1fd) is false, it does not necessarily mean motcmp22 will be automatically set as 1 (generally speaking, diff_field is much smaller than diff_field_1fd), since the difference between diff_field and diff_field_1fd may be quite small. If video has a lot of motion, this is unlikely a 2-2 pull down source. For this case, we prefer to reset the state machine.

In order for motcmp22=1, the corresponding CAF must be relatively small, which is line 10. Line 11 means diff_field is much larger than diff_field_1fd. Lines 12 to 14 are used to deal with slow motion. Line 12 means diff_field is greater (not much greater as in line 11) than diff_field_1fd. Line 13

```
1   diff_field_ratio = abs((diff_field−diff_field_1fd)*16.0/diff_field_1fd);
2   if ( (1.5*diff_field < diff_field_1fd && caf_pre<fmd_22_caf_thr2) ||
3           ( ( (diff_field<diff_field_1fd && diff_frame<diff_field_ratio*fmd_diff_frame_thr2)
4               ||(diff_field<1.25*diff_field_1fd && diff_frame<fmd_diff_frame_thr)
5           ) &&
6           (state22==0 && caf_fut<fmd_22_caf_thr || state22==1 && caf_pre<fmd_22_caf_thr)
7           )
8       )
9           motcmp22 = 0;
10  else if ( caf_fut<fmd_22_caf_thr2 &&
11              ( diff_field>1.5*diff_field_1fd ||
12                  (diff_field>diff_field_1fd &&
13                      diff_frame<diff_field_ratio*fmd_diff_frame_thr2 &&
14                      caf_fut<diff_field_ratio*fmd_22_caf_thr
15                  )
16              )
17          )
18          motcmp22 = 1;
19  else
20          lock_22_reset = 1;
```

Besides the two thresholds, fmd_diff_frame_thr and fmd_diff_frame_thr2, two other thresholds with fmd_22_caf_thr2 much greater than fmd_22_caf_thr are used in combing artifacts comparison. The default values for fmd_22_caf_thr and fmd_22_caf_thr2 are 16 and 64, respectively (it depends on how CAF is calculated), for SD video.

In line 1, diff_field_ratio is calculated as the relative difference ratio of diff_field and diff_field_1fd, which is the one field delay version of diff_field. In line 2, when diff_field is means the motion is small and line 14 means the corresponding CAF is small. Note that the CAFs used in the conditions to determine whether motcmp22 is 0 or 1 are different (one is caf_pre and the other one is caf_fut), since caf_pre is the CAF when the current field and its previous field are jammed together, and caf_fut is the CAF when the current field and its subsequent field are jammed together.

If neither the conditions from line 2 to line 8 and from line 10 to line 17 is met, then "lock_22_reset" is set as 1, which means that the 2-2 pull down state machine will be reset and it will be forced to leave film mode if it is locked to film mode.

(f) 3-2 Pull Down Detection State Machine

Figure 2F:
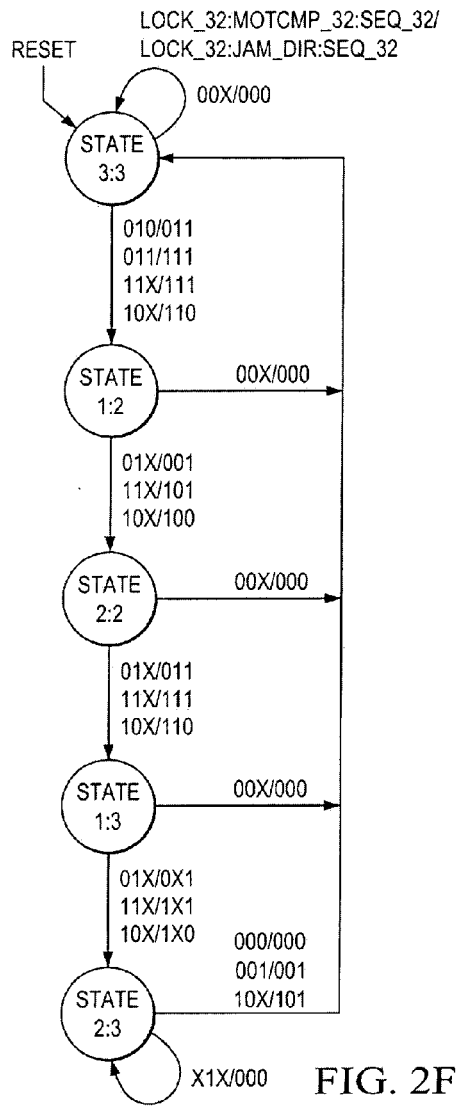

Basically, the 3-2 pull down detection state machine searches for a particular pattern of either a field difference sequence or a frame differences sequence. The implementation of 3-2 pull down detection can be in various ways. FIG. 2F shows the preferred embodiment state machine implementation. As shown in the figure, the input to the state machine is MOTCMP_32, which is the output, motcmp32, from the frame difference comparison block.

In FIG. 2F, the parameter LOCK_32 is set if a 3-2 pull down film source is detected and SEQ_32 is set if a toggling motion sequence of "01111" is observed. The parameter JAM_DIR denotes which field needs to be jammed with the current field. If JAM_DIR is 0, the jamming field is the previous field, and 1 the following field. The state machine will remain locked to a 3-2 pull down film mode if the motion sequence transitions from "01111" to a flat sequence "0XXXX" (e.g., "00000"). This prevents the unfavorable circumstance of unlocking during still scenes and relocking when motion is present. In other words, the 3-2 pull down state machine, once locked on to 3-2 pull down film source, will remain locked until motion is found out of sequence. In the preferred embodiments, the state machine will stay at state 3:2 if MOTCMP_32 is out of pattern. Once the MOTCMP_32 input becomes 0, the state machine goes to state 3:3. This design can help a fast recover from unlock to lock due to bad-edit or misdetection caused by noise, etc.

(g) 2-2 Pull Down Detection State Machine

Figure 2G:
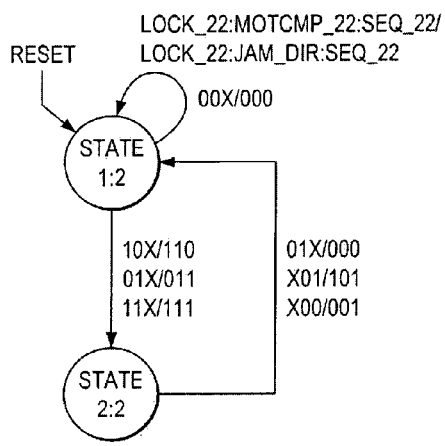

The implementation of the 2-2 pull down detection state machine is relatively simple compared to 3-2 pull down state machine. Similarly, it can be implemented in various ways. For the first preferred embodiments our implementation is shown in FIG. 2G with the input to the state machine as MOTCMP_22, which is the output from the field difference comparison block. The parameter LOCK_22 is set if a 2-2 pull down film source is detected and SEQ_22 is set if a toggling motion sequence of "10" is observed. The parameter JAM_DIR denotes which field needs to be jammed with the current field. If JAM_DIR is 0, the jamming field is the previous field, and if 1, the following field. The state machine will remain locked to a 2-2 pull down film mode if the motion sequence transitions from "0101" to a sequence "0X0X" (such as the flat sequence "0000"). This prevents the unfavorable circumstance of unlocking during still scenes and relocking when motion is present. In other words, the 2-2 pull down state machine, once locked on to 2-2 pull down film source, will remain locked until motion is found out of cadence.

(h) Film Mode Decision Logic

Figure 2H:
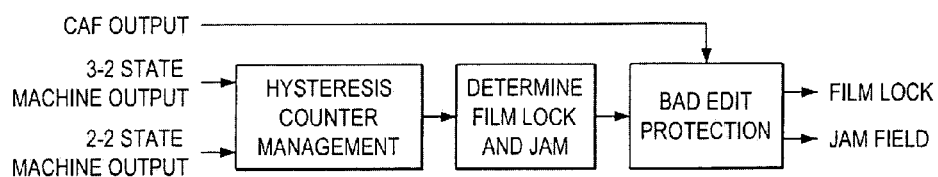

FIG. 2H shows the outputs of the 3-2 pull down state machine, the outputs of the 2-2 pull down state machine, and the combing artifacts output will be sent to a block called "Film Mode Decision Logic" to determine the state of the film mode detection, FILM_LOCK and JAM_DIR.

This block can be divided into three stages. The "Hysteresis counter management" stage performs the lock/unlock hysteresis loop. In other words, a predefined number of locks must be encountered before a film mode lock is issued. Similarly, a predefined number of unlocks must be encountered before a film mode unlock is issued. Pseudocode for the "Hysteresis counter management" is:

```
1   if (lock_32 == 1) {
2       ++lock_cnt_32;
3       if (lock_cnt_32 > 127)
4           lock_cnt_32 = 127;
5       unlock_cnt_32 = 0;
6   }
7   else {
8       ++unlock_cnt_32;
9       if (unlock_cnt_32 > 31)
10          unlock_cnt_32 = 31;
11      lock_cnt_32 = 0;
12  }
13
14  if (lock_22 == 1) {
15      ++lock_cnt_22;
16      if (lock_cnt_22 > 127)
17          lock_cnt_22 = 127;
18      unlock_cnt_22 = 0;
19  }
20  else {
21      ++unlock_cnt_22;
22      if (unlock_cnt_22 > 31)
23          unlock_cnt_22 = 31;
24      lock_cnt_22 = 0;
25  }
```

The lock_cnt_32 and unlock_cnt_32 are the lock counter and unlock counter, respectively, for 3-2 film mode state machine. Similarly, lock_cnt_22 and unlock_cnt_22 are the lock counter and unlock counter, respectively, for 2-2 film mode state machine.

The second stage is to determine whether the state machine is locked to film mode and the associated jamming field if it is locked based on the outputs from the 3-2 and 2-2 pull down state machines, which is given as:

```
1   if (lock_cnt_32 >= fmd_lock_cnt_32){
2       lock_hsy_32 = 1;
3       lock_cnt_22 = 0; // to reset 2-2 lock counter
4   }
5   else if (unlock_cnt_32 >= fmd_unlock_cnt)
6       lock_hsy_32 = 0;
7
8   if (lock_cnt_22 >= fmd_lock_cnt_22)
9       lock_hsy_22 = 1;
10  else if (unlock_cnt_22 >= fmd_unlock_cnt)
11      lock_hsy_22 = 0;
12
13  film_lock = (lock_hsy_32 | lock_hsy_22);
14  jam_dir = lock_hsy_32 ? jam_dir_32 : jam_dir_22;
```

The two thresholds, fmd_lock_cnt_32 and fmd_lock_cnt_22, are used to determine how many fields' detected results follow the particular pattern that film mode detection requires since film mode is detected (i.e., lock_cnt_32=1 or lock_cnt_22=1) before it is locked to 3-2 or 2-2 pull down film mode, respectively. The other threshold fmd_unlock_cnt is used to determine how many fields' detected results are out-of-pattern before the film mode detection exits from the locked 3-2 or 2-2 pull down mode. Usually we set fmd_lock_cnt_32 to be much greater than fmd_unlock_cnt and fmd_lock_cnt_22 to be much greater than fmd_unlock_cnt. That is, we want to enter film mode only when a relatively long sequences of fields that follow the particular pattern have been detected, while we want to exit from film mode as quickly as possible if out-of-pattern field difference or frame difference comparison results have been detected. This is because if we treat film mode source as interlaced video and thus use regular de-interlacing techniques to process it, a decent quality reconstructed picture can still be obtained, though it is not perfect. However, if we perform field jamming on interlaced video due to mis-detection, significant artifacts, typically combing artifacts, can be introduced. Thus, it is always desirable to be conservative when entering the film mode.

Finally, at the "Bad edit protection" stage, the combing artifact corresponds to the two fields that are determined by the jam direction output, jam_dir, is compared to a threshold, fmd_caf_thr, to determine if the film mode detection result could possibly be wrong due to bad edit or mixed film and video content edit. If this occurs, all the hysteresis registers are reset to their initial values and film_lock is disabled. Pseudocode for our implementation where the default value for fmd_caf_thr is set as 8196 for SD video is:

```
if (film_lock==1 &&
    ((jam_dir==0&&caf_pre>fmd_caf_thr) ||
     (jam_dir==1&&caf_fut>fmd_caf_thr) )){
        film_lock = 0;
        lock_cnt_32 = 0;
        lock_cnt_22 = 0;
        lock_22_reset = 1;
        lock_32_reset = 1;
}
```

3. Film Mode Detection Implementation

In accordance to the above realizations of the block diagram of the proposed film mode detection in FIG. 1A, a preferred embodiment implementation is shown in FIG. 3.

As shown in the figure, the overall system is partitioned into the hardware part and the software part. The hardware part contains the computation-incentive and data-incentive blocks, which require operations per pixel. The software part only contains the blocks that need operation per field. Another reason behind such partition is for design flexibility. Since the performance of this system mainly depends on the blocks of field difference comparison, frame difference comparison, and the state machine design, it is desirable to put those blocks into the software part for easy future improvement and upgrade.

In addition, besides 3-2 and 2-2 cadence, there exist video sequences with other cadences in the market. For example, professional DV camcorders can capture video at a 24 fps rate for a film, but employ special cadence such as 2-2-2-4 or 2-3-3-2 for more efficient compression. Animation is often rendered at 12 fps rate or even 8 fps rate, thus leading to 5-5 or 6-4 cadence. To allow more time for commercials, theatrical films shown on television are often sped up or edited to remove 1 out of every 13 video fields after 3-2 pull down has been applied, resulting in a cadence of 3-2-3-2-2. By adding state machines to add each cadence in this implementation, our system can theoretically detect any cadence.

4. Bad Edit Detection with Two-Field External Memory

Figure 4:
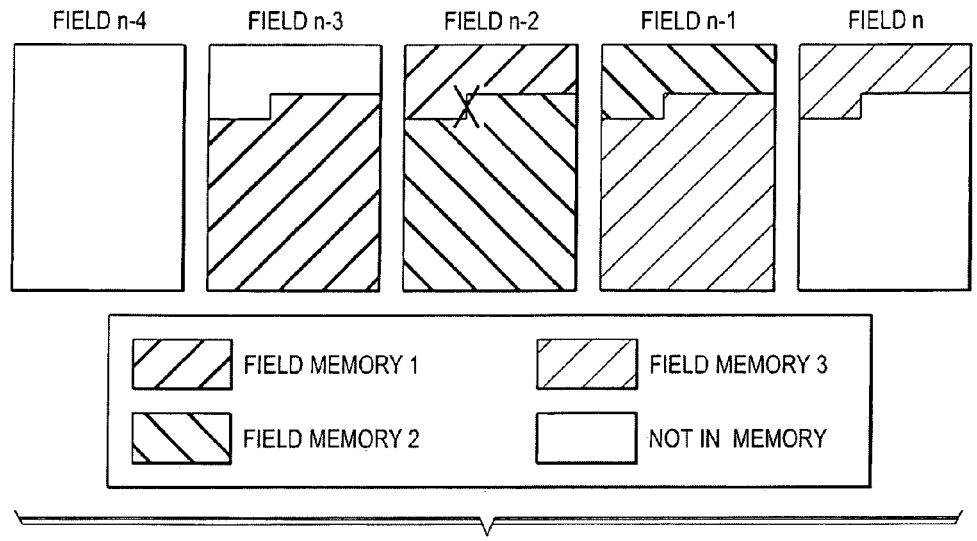
FIGS. 4-5 illustrate memory usage.

Film mode detection, both some known approaches and the preceding preferred embodiments, have used combing artifacts detection to identify mixed content or bad edits. However, these systems all assume that when combing artifacts logic is performed, the three fields' luma data, i.e., the current field, its previous field and its subsequent field, are all available in memory for access. FIG. 4 illustrated the memory status of a film mode detection system with 3-field luma memory. Each box denotes one field's luma data and they are in the order of time as "n" denotes the index of field. The shaded areas denote data in memory and thus accessible. The position marked with "X" denotes the position of the pixel currently being processed (in current field n-2). Here the field memory is assumed to operate as first-in-first-out (FIFO), so that as the processing is progressing (thinking of the pixel marked with X as moving rightward and downward), the shaded area will move accordingly, such that the area marked with each of the three shades will always cover an amount exactly equal to one field's data.

When the pixel currently being processed is the one marked with X in FIG. 4, the decision from film mode detection has already been made at the first pixel of field n-2 (that is, the decision on whether film mode is detected, and whether the current field needs to be jammed with its previous or subsequent field if film mode is detected). This is because film mode detection is a frame-based decision. That is, when the first pixel (upper left corner) of field n-2 is being processed, all the luma data of field n-3, n-2, and n-1 are available in memory. Let caf_pre be the combing artifacts when the current field and its previous field are virtually jammed and caf_fut when the current field and its subsequent field are jammed together. Thus, by using the CAF techniques described previously, caf_pre can be calculated by jamming field n-3 and n-2, and caf_fut by jamming field n-2 and n-1.

Note that film mode detection may be performed on a frame basis as the previously described preferred embodiment. The major parameters used in film mode detection are field differences (the difference between two neighboring fields) and frame differences (the difference between two closest fields with the same field parity, i.e, two odd fields or two even fields). Most film mode detection techniques function by checking whether the field difference and/or frame differences fall in some particular pattern that the film source typically has. Bad edit detection based on combing artifacts detection is usually used as an extra protection at the last stage of film mode detection. With the given caf_pre and caf_fut, bad edit protection can be fully achieved by the techniques employing combing artifacts detection at the final state of film mode detection for further protection. For example, in preceding preferred embodiment, the bad edit detection is performed at the final stage "Bad edit protection" (FIG. 2H), which implements the pseudocode.

```
if ((jam_dir==0&&caf_pre>fmd_caf_thr) ||
    (jam_dir==1&&caf_fut>fmd_caf_thr) ){
        Bad edit is detected and exit from film mode;
}
```

Here, "jam_dir" denotes the jamming direction, with "0" meaning that the current field is jammed with its previous field, and "1" meaning that the current field is jammed with its subsequent field. The "caf_pre" and "caf_fut" denote the amount of measured combing artifacts corresponding to "jam_dir=0" and "jam_dir=1", respectively. In the above logic, the combing artifact corresponding to the two fields that are determined by the jam direction output, jam_dir, is compared to a threshold, fmd_caf_thr, to determine whether the film mode detection result could possibly be wrong due to bad edit or mixed film and video content edit. If this occurs, bad edit is detected and thus we must exit from film mode and reset all the state machines used for film mode detection.

Figure 9:
FIG. 9 is an example of comb artifacts.
Figure 7D:
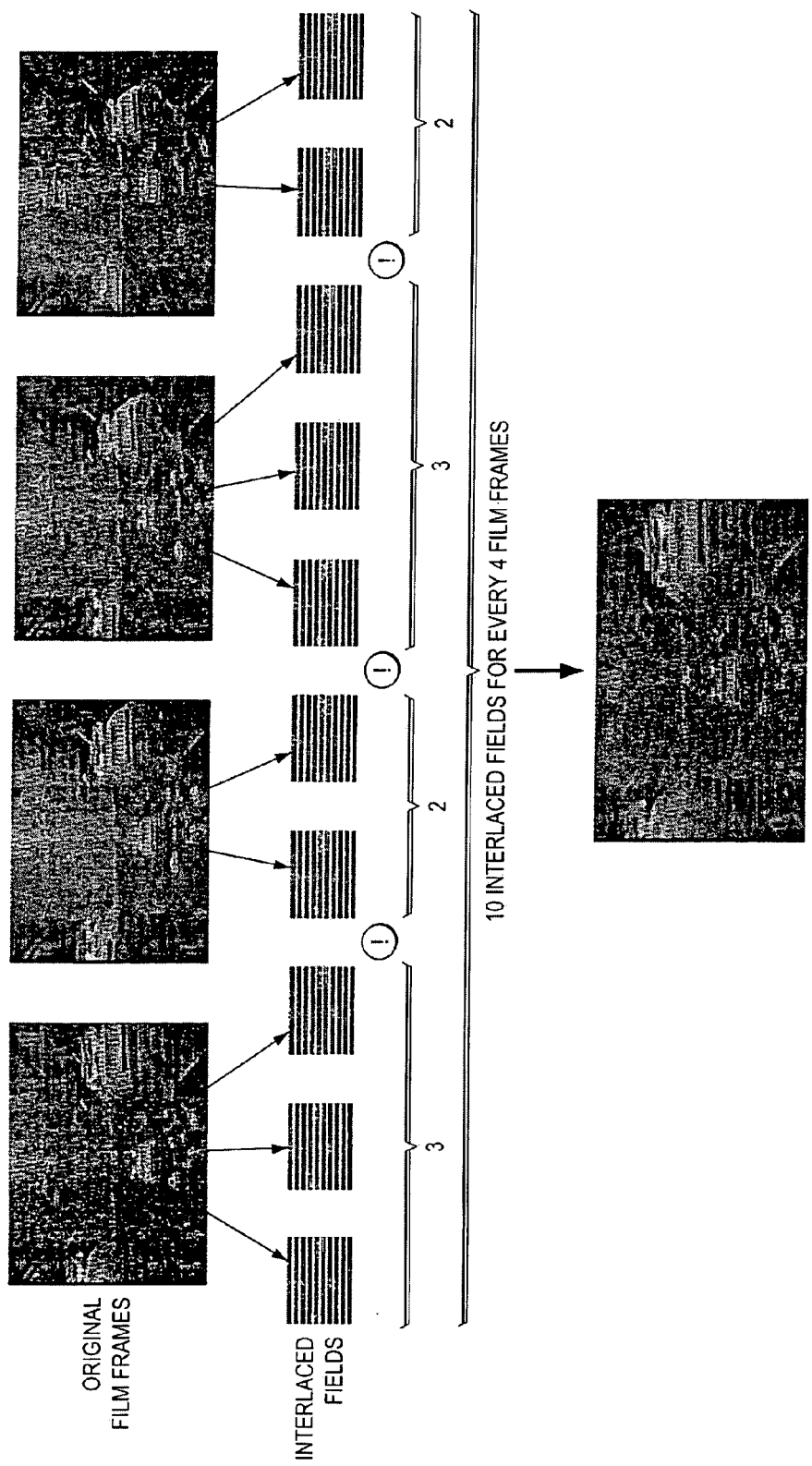
Figure 7E:
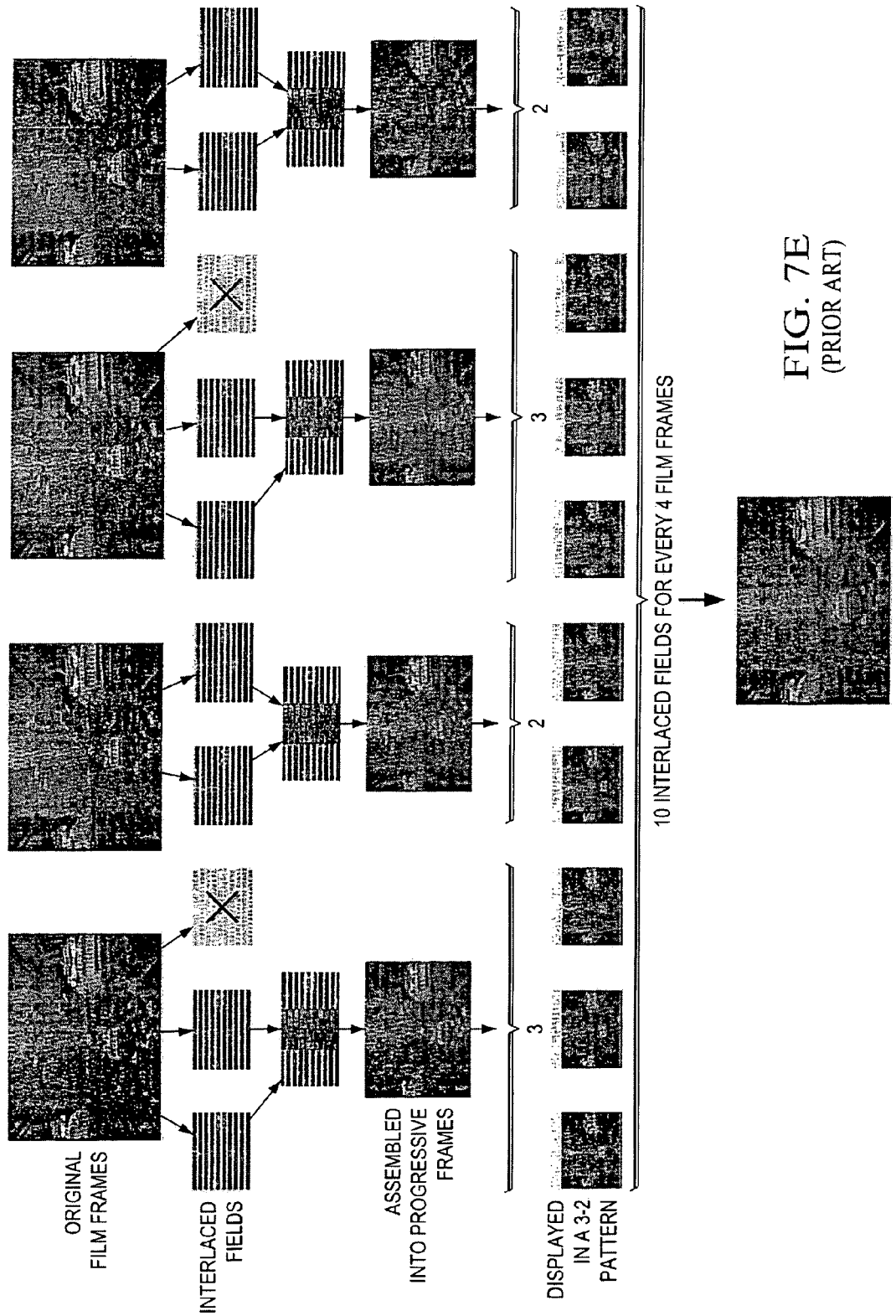
Figure 7F:
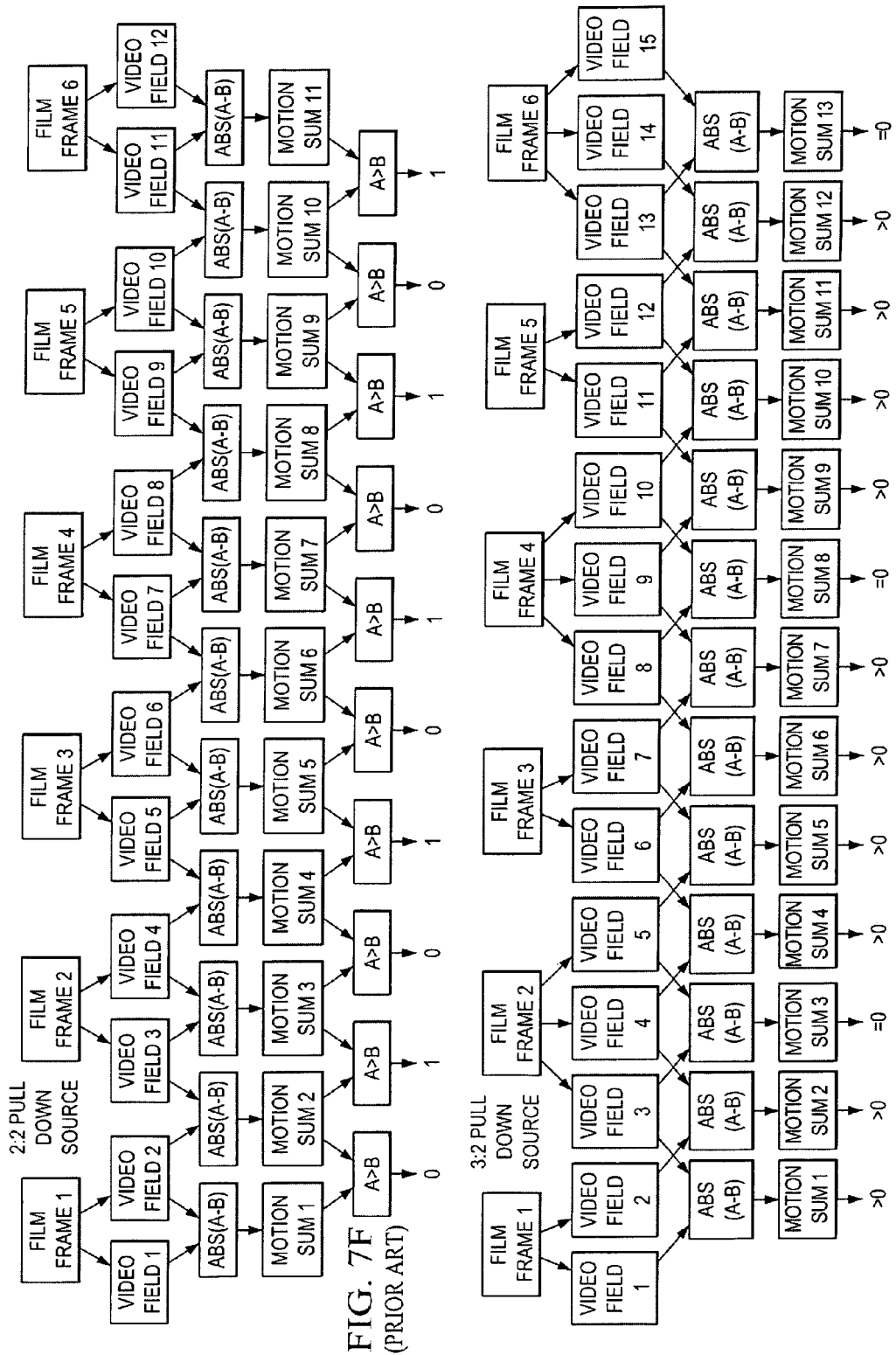

The above systems assume that when combing artifacts logic is performed, the three fields' luma data, i.e., the current field, its previous field and its subsequent field, are all available in memory for access. Then, by jamming the current field and its previous field, caf_pre can be measured, and caf_fut is then obtained by jamming the current field and its subsequent field together. If, however, only a memory with size of two fields is available for the system, due to the cost constraint, the current field with either its previous or its subsequent field, but not both, are available in memory at one time. Thus caf_pre and caf_fut cannot both be available at the same time, which means that the above bad edit protection logic will not be applicable. If a bad edit or mixed content edit occurs at the subsequent field and the film mode detection happens not to be able to detect it, it will result in combing artifacts (one such example is shown in FIG. 9) observed on display.

Figure 5:
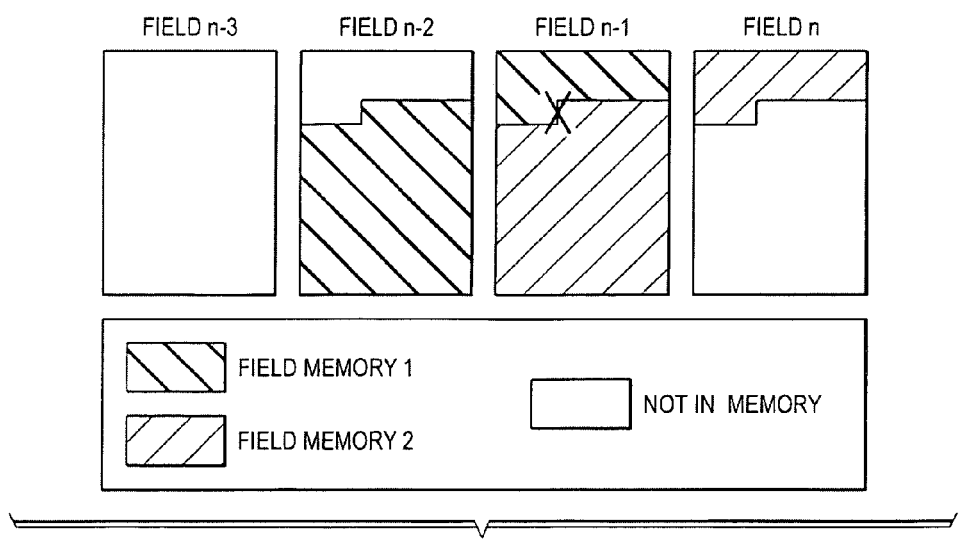

FIG. 5 illustrates the memory status of a second preferred embodiment film mode detection system with 2-field luma memory. As in FIG. 4, the pixel marked with "X" denotes the one currently being processed, and differing from FIG. 4, when the pixel currently being processed is the first pixel of field n-1, only the luma data of field n-2 and n-1 are available in memory. At this time, only the combing artifacts resulting from the jamming of the current field (field n-1) and its previous field (field n-2), caf_pre, can be calculated. In this case, as discussed previously, we cannot fully achieve bad edit detection since caf_fut is not available. If the field jamming direction resulting from film mode detection is 1, which means the current field and its subsequent field (field n) correspond to the same time instances and should be jammed together to form a progressive frame, combing artifacts may occur if field n happens to be a field due to bad edit or mixed content edit. We can detect the combing artifacts caf_fut, until the pixel being processed moves past the last pixel field n 1. But this is too late, since the processing of field n 1 is done and the progressive frame that results from jamming field n 1 and n together has already been displayed.

As discussed previously, film detection is performed on a frame basis, and bad edit detection based on combing artifacts detection is usually used as an extra protection at the last stage. However, the bad edit detection stage does not have to be performed on a frame basis, as the film mode detection does. Instead, the preferred embodiment methods perform it on a pixel basis.

In the second preferred embodiments the film mode detection operates in the regular manner, e.g., the first preferred embodiments can be used. This is because the necessary information, such as field difference and frame differences, used in the film mode detection can be obtained even when a memory with size of only two fields is available. Hence, when the first pixel of field n 1 is currently being processed, the decisions on whether film mode is detected and which field (field n 2 or field n) needs to be jammed with field n 1 have been made. Due to the lack of field n in memory, caf_fut (which is the combing artifacts when field n 1 and field n are jammed together) is not available, thus, we cannot perform a complete bad edit protection as in the previous pseudocode.

As discussed above, combing artifacts for each field, caf (n), is usually calculated as the sum of combing artifacts for all the pixels, c(j,i,n) in that field, as:

$$caf(n) = \sum_{j=1}^{M} \sum_{i=1}^{N} c(j, i, n) \quad (4.1)$$

where c(j,i,n) denotes the combing artifacts for the pixel at vertical index j, horizontal index i, and temporal index n, M denotes the number of lines, and N denotes the number of pixels in each line.

As the pixel currently being processed moves on, the accumulated combing artifacts start to cover more and more area of a field, though not the full field. If field n 1 and field n correspond to different time instances, the accumulated combing artifacts will increase and may reach a significant value before it covers a whole field. Hence, we do not have to wait for the accumulation to be finished for a whole field to perform bad edit protection.

As with the previous pseudocode, let fmd_caf_thr denote the threshold used for combing artifacts comparison for a whole field. If the accumulated combing artifacts do not cover the whole field, this threshold needs to be scaled down to match the size of the coverage. One second preferred embodiment implementation is given by the following pseudocode.

```
1  // combing artifacts accumulation. c is combing artifact for
   each pixel (j,i,n)
2  caf_fut = caf_fut+c;
3  // Scale down fmd_caf_thr to fmd_caf_thr_part to
   match the size of field
4  if (ver_pos > (height>>2))
5      fmd_caf_thr_part = fmd_caf_thr*ver_pos/height;
6  else
7      fmd_caf_thr_part = fmd_caf_thr>>2;
8
9  if ((jam_dir==0&&caf_pre>fmd_caf_thr) ||
      (jam_dir==1&&caf_fut>fmd_caf_thr_part) ){
10     Bad edit is detected and exit from film mode;
11 }
```

In the above, ver_pos is the vertical index of the pixel that is currently being processed, and fmd_caf_thr_part is the scaled version of fmd_caf_thr, which is the CAF threshold for a whole field. In line 2, combing artifacts are accumulating. The scaled version CAF threshold fmd_caf_thr_part is obtained from line 4 through 7. In order to be robust, the minimum threshold is set as a quarter of fmd_caf_thr, as shown in line 7. From line 9 through 11, bad edit protection is performed. If jam_dir=0, which means the current field will be jammed with its previous field to form a progressive frame, the corresponding CAF caf_pre is used to compare with the full CAF threshold, fmd_caf_thr. If caf_pre is greater than fmd_caf_thr, bad edit or mixed content edit is detected. While if jam_dir=1, which means the current field will be jammed with its subsequent field, then the corresponding CAF caf_fut is compared with the scaled version CAF threshold fmd_caf_thr_part to determine if there is bad edit or mixed content edit. In using this scheme, bad edit can be identified earlier to avoid displaying the progressive frame with obvious combing artifacts. For example, when ver_pos reaches ¼*height, if the accumulated artifacts are already greater than fmd_caf_thr_part (which is equal to ¼*fmd_caf_thr at this time), bad edit is detected and the processing must exit from film mode and the rest of the picture will be processed using regular de-interlacing techniques. In this case, only the top ¼ frame with combing artifacts has been displayed, and the rest will not show any combing artifacts. Since the middle part of a picture is usually the area of the interest and viewers usually focus mostly on the middle part, the effect of the combing artifacts shown at the top ¼ frame will not be that significant.

The preceding pseudocode implementation requires one multiplication and division for each pixel. The following is a much more efficient implementation, where the multiplication and division are replaced by several shift and comparison operations.

```
1  // combing artifacts accumulation. c is combing artifact for
   each pixel (j,i,n)
2  caf_fut = caf_fut+c;
3  // Scalar down fmd_caf_thr to fmd_caf_thr_part to match
```

-continued

```
     the size of field
 4   if (ver_pos > (height>>1)+(height>>2))
 5         fmd_caf_thr_part = fmd_caf_thr;
 6   else if (ver_pos > (height>>1))
 7         fmd_caf_thr_part = (fmd_caf_thr>>1) +
           (fmd_caf_thr>>2);
 8   else if (ver_pos > (height>>2))
 9         fmd_caf_thr_part = (fmd_caf_thr>>1);
10   else
11         fmd_caf_thr_part = fmd_caf_thr>>2;
12
13   if ((jam_dir==0&&caf_pre>fmd_caf_thr) ||
        (jam_dir==1&&caf_fut> fmd_caf_thr_part) ){
14        Bad edit is detected and exit from film mode;
15   }
```

As shown from line 4 through 11, the scaled version CAF threshold is calculated in a different way from the preceding implementation where fmd_caf_thr_part increases continuously with the increasing lines involved. In this implementation, however, it increases only when the vertical line index reaches ¼, ½, ¾ of the field. Thus, this implementation can be regarded as a quantization version of the preceding implementation.

In accordance to the above discussions, FIG. 6 illustrates the implementation block diagram of the second preferred embodiments where the input to this block is the luma signal y(n) and the output is FILM_LOCK (it is 1 if film mode is detected and locked, and 0 otherwise) and JAM_DIR. There are two field memories within this block. y(n) and its one field delayed signal y(n-1) are sent to "field difference calculation" block to calculate the differences between these two fields. (Such difference can be measured in various ways; one simple way is to calculate the absolute sum of differences.) The y(n) and its two-field delayed signal y(n-2) are sent to "frame difference calculation" block to calculate the differences between these two fields. (Such Difference can be measured in various ways; one simple way is to calculate the absolute sum of differences.) The y(n) and y(n 1) are also sent to "combing artifacts detection" block to calculate the combing artifacts when these two fields are jammed together. The outputs diff_frame(n 1) from the frame difference calculation block, diff_field(n 1) from the field difference calculation block, caf(n-1) from the combing artifacts detection block, are sent to "Film mode detection" block for film mode detection. The particular implementations of blocks "Frame difference calculation", "Field difference calculation", and "Film mode detection" can be as in the first preferred embodiments. The particular implementation of block "Combing artifacts detection" may also be varied.

The combing artifacts are accumulated and sent to a "Field rate register", which is a D register operating at field rate. That is, the accumulated sum of CAF for each field will be stored as caf_pre. Then caf_pre will be compared with a CAF threshold, fmd_caf_thr, when the jamming direction, JAM_DIR, is equal to 0. On the other hand, the accumulated CAF, caf_fut, will be compared with a scaled version CAF threshold, fmd_caf_thr_part, when JAM_DIR is equal to 1. Note that there is a one field delay between caf_pre and caf_fut, because caf_pre is the output from a field-rate register. If either of these two AND gates, gate 1 and 2, output 1, gate 3 will output 1, which means bad edit is detected. This will force FILM_LOCK back to 0, if the output from film detection block was 1. The calculation of fmd_caf_thr_part can be implemented as in either preceding pseudocode.

That is, the second preferred embodiments provide a bad edit and mixed content edit detection technique employing combing artifacts detection in a film mode detection system that has only a 2-field luma memory. With limited memory size, combing artifacts for the current field jammed with the subsequent field may not be available when the current field is processed. A complete bad edit protection thus cannot be achieved with the lack of such information. However, the second preferred embodiments bad edit detection performs on a pixel basis in that the accumulated CAF is continuously compared with the scaled CAF threshold to determine whether there is bad edit or mixed content edit. This technique can identify bad edit or mixed content edit at an early stage and thus avoid displaying frames with obvious combing artifacts, before the bad edit or mixed content edit has been identified using the conventional technologies.

In addition to de-interlacing applications, the preferred embodiments can be used for various other applications such as video compression and editing.

What is claimed is:

1. A method of de-interlacing video fields to determine film mode, comprising the steps of:
   (a) computing frame differences for an input sequence of video fields;
   (b) computing combing artifacts for said fields;
   (c) detecting 3-2 pull down using said frame differences together with said combing artifacts;
   (d) de-interlacing said sequence of video fields using the results of said detecting 3-2 pull down;
   (e) wherein said detecting 3-2 pull down includes comparing said frame differences to first and second thresholds, comparing said frame differences to minima of sets of previous ones of said frame differences, and comparing said combing artifacts to a third threshold;
   (f) computing field differences for said fields and detecting 2-2 pull down using said field differences and said combing artifacts; and
   (g) using the results of said detecting 2-2 pull down and said 3-2 pull down in said de-interlacing to determine film mode.

2. The method of claim 1, wherein said computing frame differences includes the summing of pixel luminance differences of successive fields of the same parity.

3. The method of claim 1, wherein said computing field differences includes summing pixel luminance differences for a field of a first parity and an interpolation of an adjacent field of parity opposite said first parity.

4. The method of claim 1, wherein said detecting 2-2 pull down includes comparing said field differences with a prior field differences, comparing said frame differences to said first and second thresholds, and comparing said combing artifacts to fourth and fifth thresholds.

5. The method of claim 1, wherein film mode is detected when either 3-2 pull down or 2-2 pull down is detected plus said combing artifacts are less than a threshold.

* * * * *